United States Patent
Noh et al.

(10) Patent No.: US 11,716,762 B2
(45) Date of Patent: *Aug. 1, 2023

(54) MULTIPLE NETWORK ALLOCATION VECTOR OPERATION

(71) Applicant: ATLAS GLOBAL TECHNOLOGIES LLC, Frisco, TX (US)

(72) Inventors: Yujin Noh, Lake Forest, CA (US); Young Hoon Kwon, Lake Forest, CA (US); Dae Won Lee, Lake Forest, CA (US); Sungho Moon, Lake Forest, CA (US)

(73) Assignee: ATLAS GLOBAL TECHNOLOGIES LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/236,714

(22) Filed: Apr. 21, 2021

(65) Prior Publication Data

US 2021/0266967 A1     Aug. 26, 2021

Related U.S. Application Data

(63) Continuation of application No. 16/404,591, filed on May 6, 2019, now Pat. No. 11,019,662, which is a
(Continued)

(51) Int. Cl.
*H04W 8/26* (2009.01)
*H04W 74/08* (2009.01)
*H04W 84/12* (2009.01)

(52) U.S. Cl.
CPC ......... *H04W 74/0816* (2013.01); *H04W 8/26* (2013.01); *H04W 84/12* (2013.01)

(58) Field of Classification Search
CPC .... H04W 74/0816; H04W 84/12; H04W 8/26
See application file for complete search history.

(56) References Cited

U.S. PATENT DOCUMENTS 11,019,662 B2 *  5/2021  Noh ................... H04W 8/26

OTHER PUBLICATIONS

Part 11: Wireless LAN Medium Access Control (MAC) and Physical Layer (PHY) Specifications, IEEE Standards 802.11, (Revision of IEEE Standard 802.11-2007), Mar. 29, 2012, pp. 1-2695, IEEE (The Institute of Electrical and Electronic Engineers, Inc.), New York, NY, USA.
(Continued)

*Primary Examiner* — Minh Trang T Nguyen

(57) ABSTRACT

A wireless device determines a Basic Service Set (BSS) associated with a wireless transmitter by receiving a first frame, determining an address of the first frame, receiving a second frame, and determining, using the address of the first frame, a property of the second frame. Determining the property of the second frame may include determining whether the second frame is intra-BSS frame or an inter-BSS frame. Determining the property of the second frame may be performed by comparing an address of the second frame with the address of the first frame, and the second frame determined to be an intra-BSS frame when the address of the first frame matches the address of the second frame, and determined to be an inter-BSS frame otherwise. The address of the first frame may be a transmitter address (TA).

20 Claims, 11 Drawing Sheets

Related U.S. Application Data continuation of application No. 15/379,400, filed on Dec. 14, 2016, now Pat. No. 10,321,485.

(60) Provisional application No. 62/404,608, filed on Oct. 5, 2016, provisional application No. 62/267,214, filed on Dec. 14, 2015.

(56) References Cited

OTHER PUBLICATIONS

Part 11: Wireless LAN Medium Access Control (MAC) and Physical Layer (PHY) Specifications, Amendment 4: Enhancements for Very High Throughput for Operation in Bands below 6 GHz, IEEE Standards 802.11ac, 2013, pp. 1-395, IEEE (The Institute of Electrical and Electronic Engineers, Inc ), New York, NY, USA.

Part 11: Wireless LAN Medium Access Control (MAC) and Physical Layer (PHY) Specifications, Amendment 2: Sub 1 GHz License Exempt Operation, IEEE P802.11ah/D5.0, Mar. 2015, pp. 1-604, IEEE (The Institute of Electrical and Electronic Engineers, Inc.), New York, NY, USA.

\* cited by examiner

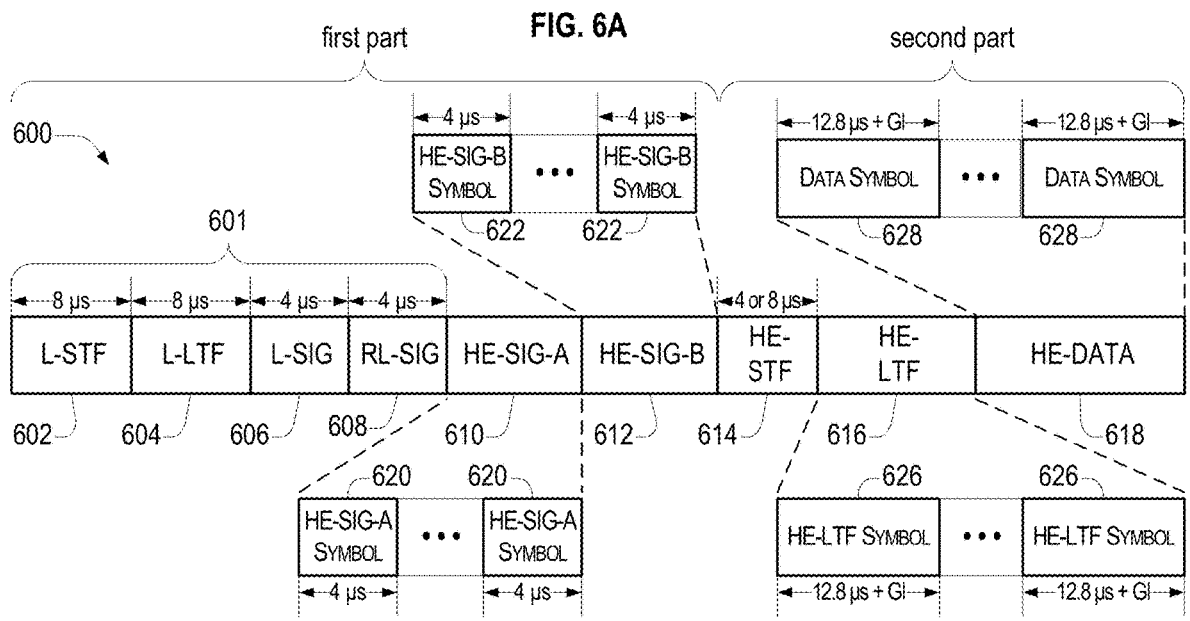

Table 1:

| Element | definition | duration | DFT period | GI | Subcarrier spacing |
|---|---|---|---|---|---|
| Legacy (L)-STF | Non-HT Short Training field | 8 μs | - | - | equiv. to 1,250 kHz |
| L-LTF | Non-HT Long Training field | 8 μs | 3.2 μs | 1.6 μs | 312.5 kHz |
| L-SIG | Non-HT Signal field | 4 μs | 3.2 μs | 0.8 μs | 312.5 kHz |
| RL-SIG | Repeated Non-HT SIGNAL field | 4 μs | 3.2 μs | 0.8 μs | 312.5 kHz |
| HE-SIG-A | HE SIGNAL A field | $N_{HESIGA} * 4$ μs | 3.2 μs | 0.8 μs | 312.5 kHz |
| HE-SIG-B | HE SIGNAL B field | $N_{HESIGB} * 4$ μs | 3.2 μs | 0.8 μs | 312.5 kHz |
| HE-STF | HE Short Training field | 4 or 8 μs | - | - | • non-trigger-based PPDU: (equiv. to) 1,250 kHz; • trigger-based PPDU: (equiv. to) 625 kHz |
| HE-LTF | HE Long Training field | $N_{HELTF} *$ (DFT period + GI)μs | 2xLTF: 6.4 μs 4xLTF: 12.8 μs | supports 0.8, 1.6, 3.2 μs | • 2xLTF: (equiv. to) 156.25 kHz; • 4xLTF: 78.125 kHz |
| HE-DATA | HE DATA field | $N_{DATA} *$ (DFT period + GI)μs | 12.8 μs | supports 0.8, 1.6, 3.2 μs | 78.125 kHz |

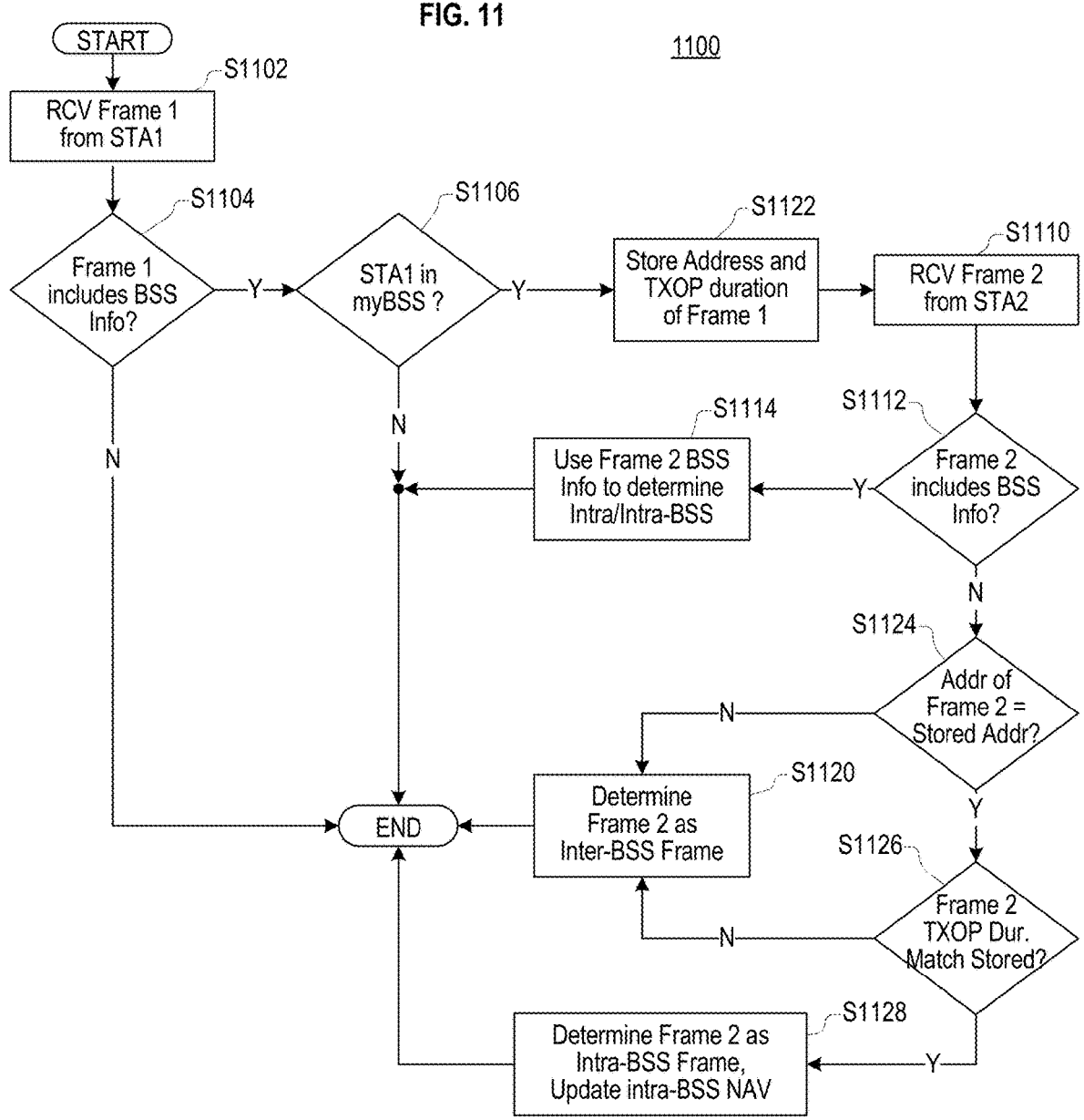

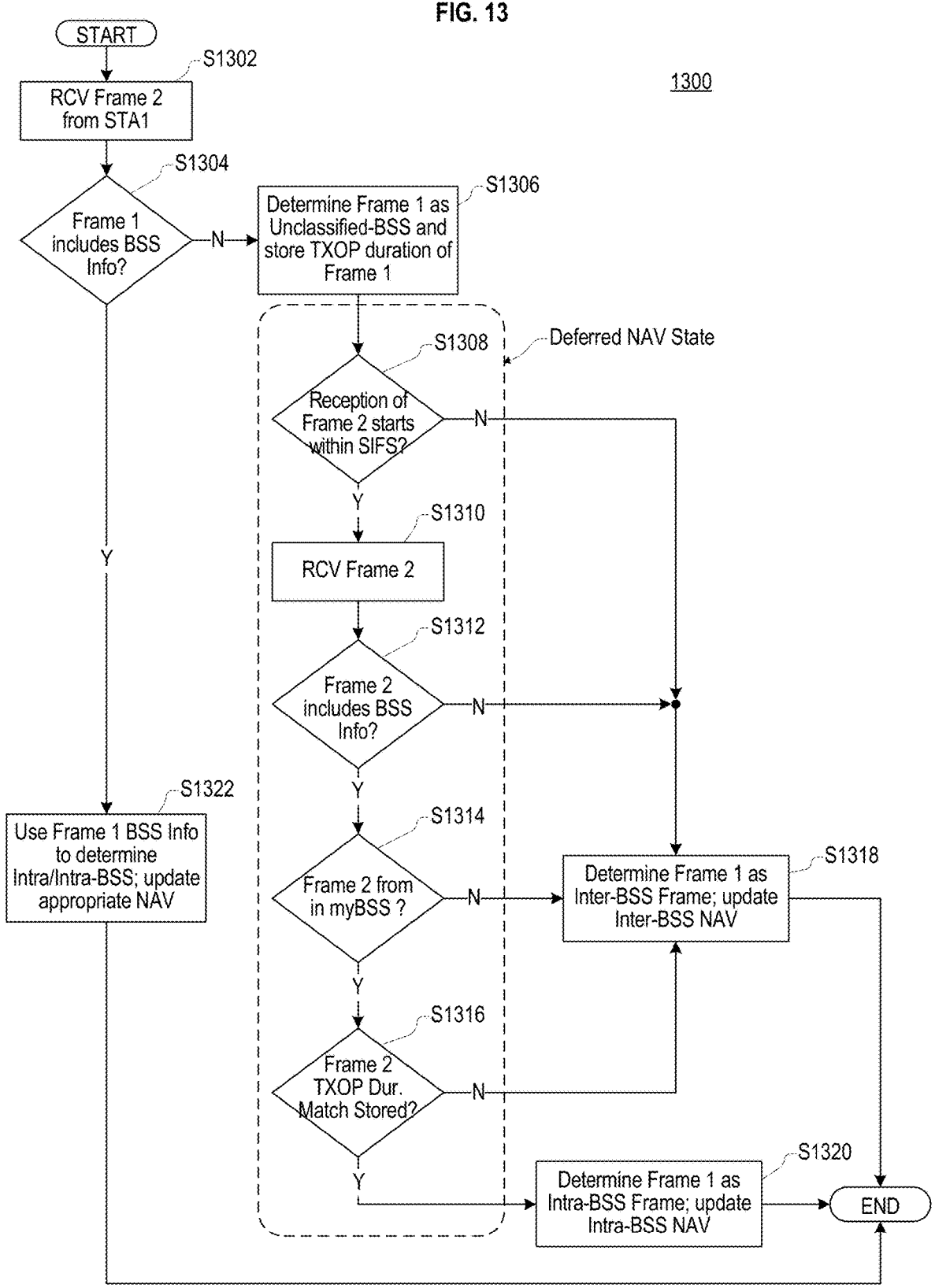

MULTIPLE NETWORK ALLOCATION VECTOR OPERATION

CROSS-REFERENCE TO RELATED APPLICATION

This application is a continuation of U.S. application Ser. No. 16/404,591, filed May 6, 2019, which is a continuation of U.S. application Ser. No. 15/379,400, filed Dec. 14, 2016, now U.S. Pat. No. 10,321,485, issued Jun. 11, 2019, which claims the benefit of U.S. Provisional Patent Application No. 62/267,214 filed Dec. 14, 2015, and U.S. Provisional Patent Application No. 62/404,608 filed Oct. 5, 2016, which are incorporated by reference herein in their entireties.

BACKGROUND

1. Technical Field

The technology described herein relates generally to wireless networking. More particularly, the technology relates to the communication of management of Network Allocation Vectors (NAVs) used in virtual carrier sensing in a wireless network.

2. Description of the Related Art

Wireless LAN (WLAN) devices are currently being deployed in diverse environments. Some of these environments have large numbers of access points (APs) and non-AP stations in geographically limited areas. In addition, WLAN devices are increasingly required to support a variety of applications such as video, cloud access, and offloading. In particular, video traffic is expected to be the dominant type of traffic in many high efficiency WLAN deployments. With the real-time requirements of some of these applications, WLAN users demand improved performance in delivering their applications, including improved power consumption for battery-operated devices.

A WLAN is being standardized by the IEEE (Institute of Electrical and Electronics Engineers) Part 11 under the name of "Wireless LAN Medium Access Control (MAC) and Physical Layer (PHY) Specifications." A series of standards have been adopted as the WLAN evolved, including IEEE Std 802.11™-2012 (March 2012) (IEEE 802.11n). The IEEE Std 802.11 was subsequently amended by IEEE Std 802.11ae™-2012, IEEE Std 802.11aa™-2012, IEEE Std 802.11ad™-2012, and IEEE Std 802.11ac™-2013 (IEEE 802.11ac).

Recently, an amendment focused on providing a High Efficiency (HE) WLAN in high-density scenarios is being developed by the IEEE 802.11ax task group. The 802.11ax amendment focuses on improving metrics that reflect user experience, such as average per station throughput, the 5th percentile of per station throughput of a group of stations, and area throughput. Improvements may be made to support environments such as wireless corporate offices, outdoor hotspots, dense residential apartments, and stadiums.

Wireless networks may employ virtual carrier sensing using Network Allocation Vectors (NAVs). A station's NAV, when set, indicates that in some circumstances the station should not attempt to transmit, even if the wireless medium the transmission would be on appears to not be in use.

In a HE WLAN system, a station may maintain two NAV values. A first NAV value relates to Intra-Basic Service Set (Intra-BSS) frames (frames transmitted by devices associated with a same AP as the station) and a second NAV value that relates to Inter-BSS frames (frames transmitted by devices that are not associated with the same AP as the station) and frames that cannot be determined to be Intra-BSS frames or Inter-BSS frames.

When a frame cannot be identified as either an Intra-BSS frame or an Inter-BSS frame, operations relying on the first NAV, the second NAV, or both may prevent uses of the wireless medium that would be allowed if the frame was properly identified, and thereby reduce the efficiency of the HE WLAN system.

SUMMARY

In an embodiment, a method performed by a first wireless device for determining a Basic Service Set (BSS) associated with a wireless transmitter comprises receiving, by the first wireless device, a first frame, determining an address of the first frame, receiving, by the first wireless device, a second frame, and determining, using the address of the first frame, a property of the second frame.

In an embodiment, determining the property of the second frame comprises determining whether the second frame is intra-BSS frame or an inter-BSS frame.

In an embodiment, determining the property of the second frame comprises comparing an address of the second frame with the address of the first frame. The second frame is determined to be an intra-BSS frame when the address of the first frame matches the address of the second frame, and determined to be an inter-BSS frame when the address of the first frame fails to match with the address of the second frame.

In an embodiment, the address of the second frame is a receiver address (RA) and the address of the first frame is a transmitter address (TA).

In an embodiment, the method further comprises setting an inter-BSS network allocation vector (NAV) in response to determining that the second frame is an inter-BSS frame, and setting an intra-BSS NAV in response to determining that the second frame is an intra-BSS frame.

In an embodiment, the first frame is not targeted to the first wireless device.

In an embodiment, the second frame is not targeted to the first wireless device.

In an embodiment, the method further comprises determining whether the first frame is an intra-BSS frame, and determining the address of the first frame comprises storing the address of the first frame when the first frame is determined to be an intra-BSS frame.

In an embodiment, the address of the first frame is a transmitter address of a second wireless device transmitting the first frame.

In an embodiment, the address of the first frame is an address of a holder of a Transmission Opportunity (TXOP) in which the first frame is transmitted.

In an embodiment, receiving the second frame comprises receiving the second frame within a Short Intra-Frame Space (SIFS) of an end of receiving the first frame.

In an embodiment, receiving the second frame comprises receiving the second frame within a duration of a Transmission Opportunity (TXOP).

In an embodiment, the method further comprises determining whether the second frame includes valid BSS information. The BSS information provides an indication of a BSS that the device transmitting the first frame is associated with. Determining, using the address of the first frame, the property of the second frame is performed in response to the second frame being determined to not include the valid BSS information.

In an embodiment, the first frame is a request-to-send (RTS) frame and the second frame is a clear-to-send (CTS) frame, or the first frame is a data frame and the second frame is an acknowledgement frame.

In an embodiment, a wireless device comprises a receiver circuit. The wireless device is to determine a Basic Service Set (BSS) associated with a wireless transmitter. Determining the BSS associated with the wireless transmitter comprises receiving, using the receiver circuit, first frame, determining an address of the first frame, receiving, using the receiver circuit, a second frame, and determining, using the address of the first frame, a property of the second frame.

In an embodiment, determining the property of the second frame comprises determining whether the second frame is intra-BSS frame or an inter-BSS frame.

In an embodiment, determining the property of the second frame comprises comparing an address of the second frame with the address of the first frame. The second frame is determined to be an intra-BSS frame when the address of the first frame matches the address of the second frame. The second frame is determined to be an inter-BSS frame when the address of the first frame fails to match with the address of the second frame.

In an embodiment, the address of the second frame is a receiver address (RA) and the address of the first frame is a transmitter address (TA).

In an embodiment, the first frame is not targeted to the first wireless device and the second frame is not targeted to the first wireless device.

In an embodiment, determining the BSS associated with the wireless transmitter comprises determining whether the first frame is an intra-BSS frame, and determining the address of the first frame comprises storing the address of the first frame when the first frame is determined to be an intra-BSS frame.

BRIEF DESCRIPTION OF THE DRAWINGS

FIG. 6A illustrates an HE PHY Protocol Data Units (PPDU), according to an embodiment.

FIG. 6B shows a Table 1 disclosing additional properties of fields of the HE PPDU frame of FIG. 6A, according to an embodiment.

FIG. 11 illustrates a process for determining whether a frame is an Inter-BSS or Intra-BSS frame, according to another embodiment.

FIG. 13 illustrates a process for determining whether a frame is an Inter-BSS or Intra-BSS frame, according to another embodiment.

DETAILED DESCRIPTION

Figure 1:
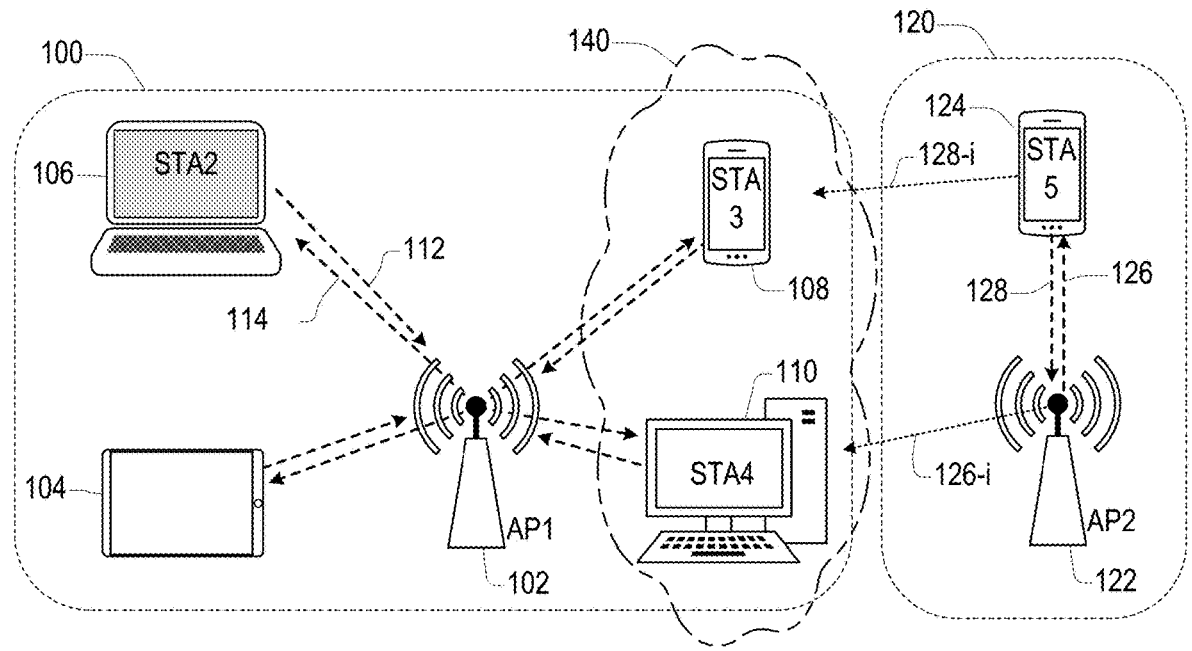
FIG. 1 illustrates wireless networks, according to an embodiment.

The technology described herein relates generally to wireless networking. More particularly, the technology relates to techniques for intra-BSS and inter BSS frame detection.

In the following detailed description, certain illustrative embodiments have been illustrated and described. As those skilled in the art would realize, these embodiments are capable of modification in various different ways without departing from the scope of the present disclosure. Accordingly, the drawings and description are to be regarded as illustrative in nature and not restrictive. Like reference numerals designate like elements in the specification.

FIG. 1 illustrates wireless networks according to an embodiment. The wireless networks include first and second infrastructure Basic Service Sets (BSSs) 100 and 120 of Wireless Local Area Networks (WLANs). In an 802.11 WLAN, the BSS provides the basic organizational unit and typically includes an Access Point (AP) and one or more associated stations (STAs).

The first BSS 100 includes a first Access Point 102 (also referred to as AP1) wirelessly communicating with first, second, third, and fourth wireless devices (or stations) 104, 106, 108, and 110 (also referred to as stations STA1, STA2, STA3, and STA4, respectively). The second BSS 120 includes a second AP 122 (also referred to as AP2) and a fifth device (or station) 124 (also referred to as station STA5). The wireless devices may each include a medium access control (MAC) layer and a physical (PHY) layer according to an IEEE 802.11 standard.

Although FIG. 1 shows the first BSS 100 including only the first to fourth stations STA1 to STA4 and the second BSS 120 including only the fifth station STA5, embodiments are not limited thereto and may comprise BSSs including any number of stations.

The first AP 102 is a station, that is, a STA, configured to control and coordinate functions of the BSS 100. The first AP 102 may transmit information to a single station selected from the plurality of stations STA1 to STA4 in the first BSS 100 using a single frame, or may simultaneously transmit information to two or more of the stations STA1 to STA4 in the first BSS 100 using either a single Orthogonal Frequency Division Multiplexing (OFDM) broadcast frame, a single OFDM Multi-User Multi-Input-Multi-Output (MU-MIMO) transmission, a single Orthogonal Frequency Division Multiple Access (OFDMA) frame, or a single MU-MIMO OFDMA frame.

The stations STA1 to STA4 may each transmit data to the first AP 102 using a single frame, or transmit information to and receive information from each other using a single frame. Two or more of the stations STA1 to STA4 may simultaneously transmit data to the first AP 102 using an Uplink (UL) OFDMA frame, an UL MU-MIMO frame, or an UL MU-MIMO OFDMA frame.

In another embodiment, the first AP 102 may be absent and the stations STA1 to STA4 may be in an ad-hoc network.

The second AP 122 is a station configured to control and coordinate functions of the second BSS 120. The second AP 122 may transmit information to the fifth station STA5 in the second BSS 120 using a single frame, or may simultaneously transmit information to two or more stations (not shown) of the second BSS 120 using either a single OFDM broadcast frame, a single OFDM MU-MIMO transmission, a single OFDMA frame, or a single MU-MIMO OFDMA frame.

The fifth station STA5 may transmit data to the second AP 122 using a single frame. Two or more of the stations (not shown) of the second BSS 120 may simultaneously transmit data to the second AP 122 using an Uplink (UL) OFDMA frame, an UL MU-MIMO frame, or an UL MU-MIMO OFDMA frame.

FIG. 1 shows a first intra-BSS Down-Link (DL) transmission 114 and a first intra-BSS Up-Link (UL) transmission 112 of the first BSS 100, and shows a second intra-BSS DL transmission 126 and a second intra-BSS UL transmission 128 of the second BSS 120. Intra-BSS transmissions are transmissions between an AP and stations associated with the BSS that the AP controls or between two stations associated with the same BSS.

FIG. 1 also shows first and second inter-BSS transmissions 128-i and 126-i. Inter-BSS transmissions are transmissions transmitted by an AP or station of one BSS and received by an AP or station of another BSS. Here, the first inter-BSS transmission 128-i is an interfering transmission, received by but not targeted to the third station STA3 associated with the first BSS 100, that was produced as a result of the transmission of the second intra-BSS UL transmission 128 by the fifth station STA5 associated with the second BSS 120. The second inter-BSS transmission 126-i is an interfering transmission, received by but not targeted to the fourth station STA4 associated with the first BSS 100, that was produced as a result of the transmission of the second intra-BSS DL transmission 126 by the second AP 122 that controls the second BSS 120.

The third and fourth stations STA3 and STA4 are located in an Overlapping BSS (OBSS) area 140 of the first and second BSSs 100 and 120. Stations in the OBSS area 140 may receive transmission from both devices associated with the first BSS 100 and devices associated with the second BSS 120. Transmissions of the stations in the OBSS area 140 may also interfere with transmissions of both the first BSS 100 and the second BSS 120 under some circumstances.

Each of the stations STA1 to STA4 and the AP 102 includes a processor and a transceiver, and may further include a user interface and a display device.

The processor is configured to generate a frame to be transmitted through a wireless network, to process a frame received through the wireless network, and to execute protocols of the wireless network. The processor may perform some or all of its functions by executing computer programming instructions stored on a non-transitory computer-readable medium.

The transceiver represents a unit functionally connected to the processor, and designed to transmit and receive a frame through the wireless network. The transceiver may include a single component that performs the functions of transmitting and receiving, or two separate components each performing one of such functions.

The processor and transceiver of the stations STA1 to STA5, the first AP 102, and the second AP 122 may be respectively implemented using hardware components, software components, or both.

The first and second APs 102 and 122 may each be or include a WLAN router, a stand-alone Access Point, a WLAN bridge, a Light-Weight Access Point (LWAP) managed by a WLAN controller, and the like. In addition, a device such as a personal computer, tablet computer, or cellular phone may configured able to operate as the first or second APs 102 or 122, such as when a cellular phone is configured to operate as a wireless "hot spot."

Each of the stations STA1 to STA5 may be or may include a desktop computer, a laptop computer, a tablet PC, a wireless phone, a mobile phone, a smart phone, an e-book reader, a Portable Multimedia Player (PMP), a portable game console, a navigation system, a digital camera, a Digital Multimedia Broadcasting (DMB) player, a digital audio recorder, a digital audio player, a digital picture recorder, a digital picture player, a digital video recorder, a digital video player, and the like.

The present disclosure may be applied to WLAN systems according to IEEE 802.11 standards but embodiments are not limited thereto.

In IEEE 802.11 standards, frames exchanged between stations (including access points) are classified into management frames, control frames, and data frames. A management frame may be a frame used for exchanging management information that is not forwarded to a higher layer of a communication protocol stack. A control frame may be a frame used for controlling access to a medium. A data frame may be a frame used for transmitting data to be forwarded to the higher layer of the communication protocol stack.

A type and subtype of a frame may be identified using a type field and/or a subtype field included in a control field of the frame, as prescribed in the applicable standard.

Figure 2:
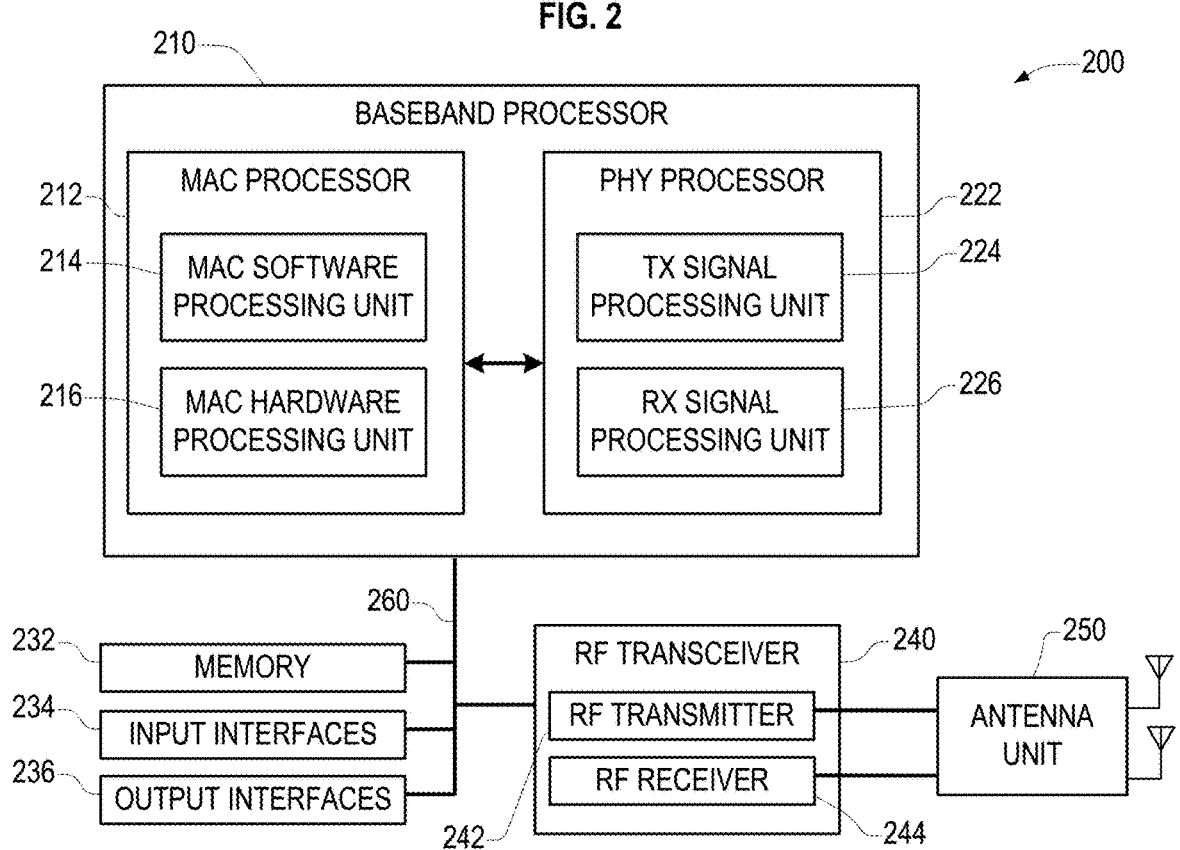
FIG. 2 is a schematic diagram of a wireless device, according to an embodiment.

FIG. 2 illustrates a schematic block diagram of a wireless device 200 according to an embodiment. The wireless or WLAN device 200 may be included in the APs 102 or 122 or any of the stations STA1 to STA5 in FIG. 1. The WLAN device 200 includes a baseband processor 210, a radio frequency (RF) transceiver 240, an antenna unit 250, a storage device (e.g., memory) 232, one or more input interfaces 234, and one or more output interfaces 236. The baseband processor 210, the memory 232, the input interfaces 234, the output interfaces 236, and the RF transceiver 240 may communicate with each other via a bus 260.

The baseband processor 210 performs baseband signal processing, and includes a MAC processor 212 and a PHY processor 222. The baseband processor 210 may utilize the memory 232, which may include a non-transitory computer readable medium having software (e.g., computer programming instructions) and data stored therein.

In an embodiment, the MAC processor 212 includes a MAC software processing unit 214 and a MAC hardware processing unit 216. The MAC software processing unit 214 may implement a first plurality of functions of the MAC layer by executing MAC software, which may be included in the software stored in the memory 232. The MAC hardware processing unit 216 may implement a second plurality of functions of the MAC layer in special-purpose hardware. However, the MAC processor 212 is not limited thereto. For example, the MAC processor 212 may be configured to perform the first and second plurality of functions entirely in software or entirely in hardware according to an implementation.

The PHY processor 222 includes a transmitting signal processing unit (SPU) 224 and a receiving SPU 226. The PHY processor 222 implements a plurality of functions of the PHY layer. These functions may be performed in software, hardware, or a combination thereof according to an implementation.

Functions performed by the transmitting SPU 224 may include one or more of Forward Error Correction (FEC) encoding, stream parsing into one or more spatial streams, diversity encoding of the spatial streams into a plurality of space-time streams, spatial mapping of the space-time streams to transmit chains, inverse Fourier Transform (iFT) computation, Cyclic Prefix (CP) insertion to create a Guard Interval (GI), and the like. Functions performed by the receiving SPU 226 may include inverses of the functions performed by the transmitting SPU 224, such as GI removal, Fourier Transform computation, and the like.

The RF transceiver 240 includes an RF transmitter 242 and an RF receiver 244. The RF transceiver 240 is configured to transmit first information received from the baseband processor 210 to the WLAN, and provide second information received from the WLAN to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas. In an embodiment, the antennas in the antenna unit 250 may operate as a beamformed antenna array. In an embodiment, the antennas in the antenna unit 250 may be directional antennas, which may be fixed or steerable.

The input interfaces 234 receive information from a user, and the output interfaces 236 output information to the user. The input interfaces 234 may include one or more of a keyboard, keypad, mouse, touchscreen, microphone, and the like. The output interfaces 236 may include one or more of a display device, touch screen, speaker, and the like.

As described herein, many functions of the WLAN device 200 may be implemented in either hardware or software. Which functions are implemented in software and which functions are implemented in hardware will vary according to constraints imposed on a design. The constraints may include one or more of design cost, manufacturing cost, time to market, power consumption, available semiconductor technology, and so on.

As described herein, a wide variety of electronic devices, circuits, firmware, software, and combinations thereof may be used to implement the functions of the components of the WLAN device 200. Furthermore, the WLAN device 200 may include other components, such as application processors, storage interfaces, clock generator circuits, power supply circuits, and the like, which have been omitted in the interest of brevity.

Figure 3A:
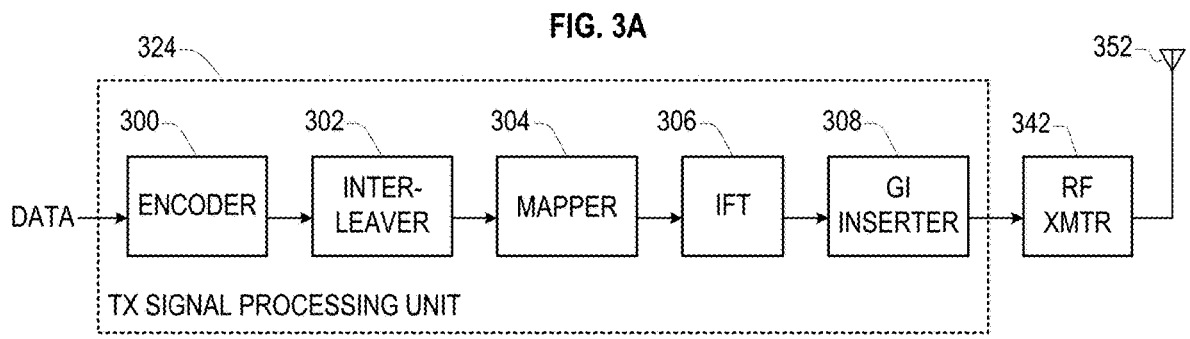
FIG. 3A illustrates components of a wireless device configured to transmit data, according to an embodiment.

FIG. 3A illustrates components of a wireless device configured to transmit data according to an embodiment, including a Transmitting (Tx) SPU (TxSP) 324, an RF transmitter 342, and an antenna 352. In an embodiment, the TxSP 324, the RF transmitter 342, and the antenna 352 correspond to the transmitting SPU 224, the RF transmitter 242, and an antenna of the antenna unit 250 of FIG. 2, respectively.

The TxSP 324 includes an encoder 300, an interleaver 302, a mapper 304, an inverse Fourier transformer (IFT) 306, and a guard interval (GI) inserter 308.

The encoder 300 receives and encodes input data DATA. In an embodiment, the encoder 300 includes a forward error correction (FEC) encoder. The FEC encoder may include a binary convolutional code (BCC) encoder followed by a puncturing device. The FEC encoder may include a low-density parity-check (LDPC) encoder.

The TxSP 324 may further include a scrambler for scrambling the input data before the encoding is performed by the encoder 300 to reduce the probability of long sequences of 0s or 1s. When the encoder 300 performs the BCC encoding, the TxSP 324 may further include an encoder parser for demultiplexing the scrambled bits among a plurality of BCC encoders. If LDPC encoding is used in the encoder, the TxSP 324 may not use the encoder parser.

The interleaver 302 interleaves the bits of each stream output from the encoder 300 to change an order of bits therein. The interleaver 302 may apply the interleaving only when the encoder 300 performs the BCC encoding, and otherwise may output the stream output from the encoder 300 without changing the order of the bits therein.

The mapper 304 maps the sequence of bits output from the interleaver 302 to constellation points. If the encoder 300 performed LDPC encoding, the mapper 304 may also perform LDPC tone mapping in addition to the constellation mapping.

When the TxSP 324 performs a MIMO or MU-MIMO transmission, the TxSP 324 may include a plurality of interleavers 302 and a plurality of mappers 304 according to a number of spatial streams (NSS) of the transmission. The TxSP 324 may further include a stream parser for dividing the output of the encoder 300 into blocks and may respectively send the blocks to different interleavers 302 or mappers 304. The TxSP 324 may further include a space-time block code (STBC) encoder for spreading the constellation points from the spatial streams into a number of space-time streams (NSTS) and a spatial mapper for mapping the space-time streams to transmit chains. The spatial mapper may use direct mapping, spatial expansion, or beamforming.

The IFT 306 converts a block of the constellation points output from the mapper 304 (or, when MIMO or MU-MIMO is performed, the spatial mapper) to a time domain block (i.e., a symbol) by using an inverse discrete Fourier transform (IDFT) or an inverse fast Fourier transform (IFFT). If the STBC encoder and the spatial mapper are used, the IFT 306 may be provided for each transmit chain.

When the TxSP 324 performs a MIMO or MU-MIMO transmission, the TxSP 324 may insert cyclic shift diversities (CSDs) to prevent unintentional beamforming. The TxSP 324 may perform the insertion of the CSD before or after the IFT 306. The CSD may be specified per transmit chain or may be specified per space-time stream. Alternatively, the CSD may be applied as a part of the spatial mapper.

When the TxSP 324 performs a MIMO or MU-MIMO transmission, some blocks before the spatial mapper may be provided for each user.

The GI inserter 308 prepends a GI to each symbol produced by the IFT 306. Each GI may include a Cyclic Prefix (CP) corresponding to a repeated portion of the end of the symbol that the GI precedes. The TxSP 324 may optionally perform windowing to smooth edges of each symbol after inserting the GI.

The RF transmitter 342 converts the symbols into an RF signal and transmits the RF signal via the antenna 352. When the TxSP 324 performs a MIMO or MU-MIMO transmission, the GI inserter 308 and the RF transmitter 342 may be provided for each transmit chain.

Figure 3B:
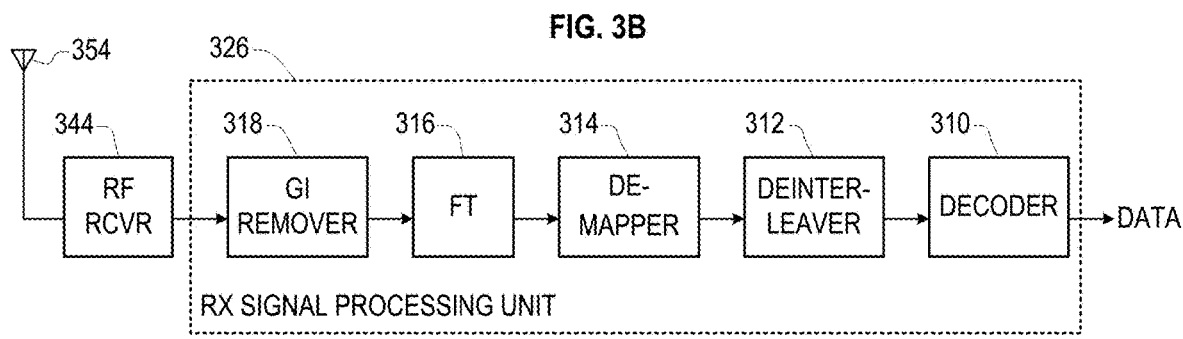
FIG. 3B illustrates components of a wireless device configured to receive data, according to an embodiment.

FIG. 3B illustrates components of a wireless device configured to receive data according to an embodiment, including a Receiver (Rx) SPU (RxSP) 326, an RF receiver 344, and an antenna 354. In an embodiment, the RxSP 326, RF receiver 344, and antenna 354 may correspond to the receiving SPU 226, the RF receiver 244, and an antenna of the antenna unit 250 of FIG. 2, respectively.

The RxSP 326 includes a GI remover 318, a Fourier transformer (FT) 316, a demapper 314, a deinterleaver 312, and a decoder 310.

The RF receiver 344 receives an RF signal via the antenna 354 and converts the RF signal into symbols. The GI remover 318 removes the GI from each of the symbols. When the received transmission is a MIMO or MU-MIMO transmission, the RF receiver 344 and the GI remover 318 may be provided for each receive chain.

The FT 316 converts each symbol (that is, each time domain block) into a frequency domain block of constellation points by using a discrete Fourier transform (DFT) or a fast Fourier transform (FFT). The FT 316 may be provided for each receive chain.

When the received transmission is the MIMO or MU-MIMO transmission, the RxSP 326 may include a spatial demapper for converting the respective outputs of the FTs 316 of the receiver chains to constellation points of a plurality of space-time streams, and an STBC decoder for despreading the constellation points from the space-time streams into one or more spatial streams.

The demapper 314 demaps the constellation points output from the FT 316 or the STBC decoder to bit streams. If the received transmission was encoded using the LDPC encoding, the demapper 314 may further perform LDPC tone demapping before performing the constellation demapping.

The deinterleaver 312 deinterleaves the bits of each stream output from the demapper 314. The deinterleaver 312 may perform the deinterleaving only when the received transmission was encoded using the BCC encoding, and otherwise may output the stream output by the demapper 314 without performing deinterleaving.

When the received transmission is the MIMO or MU-MIMO transmission, the RxSP 326 may use a plurality of demappers 314 and a plurality of deinterleavers 312 corresponding to the number of spatial streams of the transmission. In this case, the RxSP 326 may further include a stream deparser for combining the streams output from the deinterleavers 312.

The decoder 310 decodes the streams output from the deinterleaver 312 or the stream deparser. In an embodiment, the decoder 312 includes an FEC decoder. The FEC decoder may include a BCC decoder or an LDPC decoder.

The RxSP 326 may further include a descrambler for descrambling the decoded data. When the decoder 310 performs the BCC decoding, the RxSP 326 may further include an encoder deparser for multiplexing the data decoded by a plurality of BCC decoders. When the decoder 310 performs the LDPC decoding, the RxSP 326 may not use the encoder deparser.

Before making a transmission, wireless devices such as wireless device 200 will assess the availability of the wireless medium using Clear Channel Assessment (CCA). If the medium is occupied, CCA may determine that it is busy, while if the medium is available, CCA determines that it is idle.

The PHY entity for IEEE Std 802.11 is based on Orthogonal Frequency Division Multiplexing (OFDM) or Orthogonal Frequency Division Multiple Access (OFDMA). In either OFDM or OFDMA Physical (PHY) layers, a STA is capable of transmitting and receiving Physical Layer Protocol Data Units (PPDUs) that are compliant with the mandatory PHY specifications. A PHY specification defines a set of Modulation and Coding Schemes (MCS) and a maximum number of spatial streams. Some PHY entities define downlink (DL) and uplink (UL) Multi-User (MU) transmissions having a maximum number of space-time streams (STS) per user and employing up to a predetermined total number of STSs.

Figure 4:
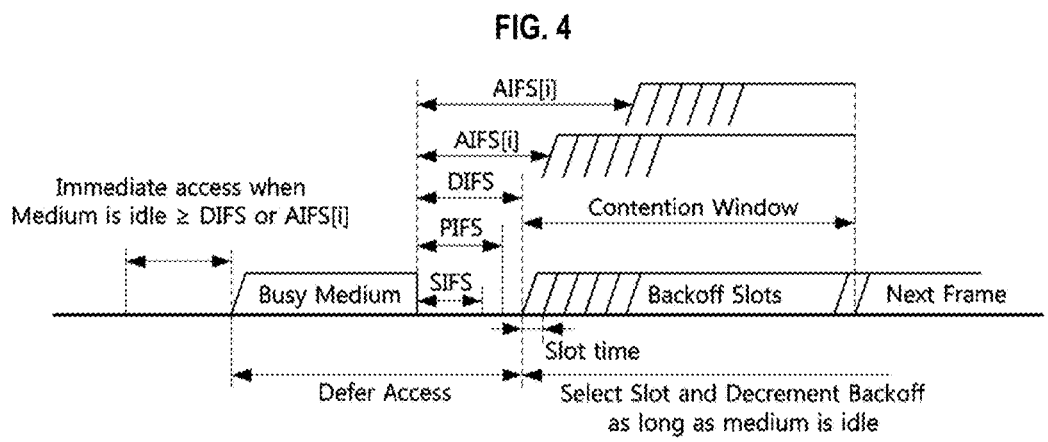
FIG. 4 illustrates Inter-Frame Space (IFS) relationships.

FIG. 4 illustrates Inter-Frame Space (IFS) relationships. FIG. 4 illustrates a Short IFS (SIFS), a Point Coordination Function (PCF) IFS (PIFS), a Distributed Coordination Function (DCF) IFS (DIFS), and an Arbitration IFSs corresponding to an Access Category (AC) 'i' (AIFS[i]). FIG. 4 also illustrates a slot time.

A data frame is used for transmission of data forwarded to a higher layer. The WLAN device transmits the data frame after performing backoff if a DIFS has elapsed during which DIFS the medium has been idle.

A management frame is used for exchanging management information, which is not forwarded to the higher layer. Subtype frames of the management frame include a beacon frame, an association request/response frame, a probe request/response frame, and an authentication request/response frame.

A control frame is used for controlling access to the medium. Subtype frames of the control frame include a request to send (RTS) frame, a clear to send (CTS) frame, and an acknowledgement (ACK) frame.

When the control frame is not a response frame of another frame, the WLAN device transmits the control frame after performing backoff if a DIFS has elapsed during which DIFS the medium has been idle. When the control frame is the response frame of another frame, the WLAN device transmits the control frame after a SIFS has elapsed without performing backoff or checking whether the medium is idle.

A WLAN device that supports a Quality of Service (QoS) functionality (that is, a QoS station) may transmit the frame after performing backoff if an AIFS for an associated access category (AC), (AIFS[AC]), has elapsed. When transmitted by the QoS station, any of the data frame, the management frame, and the control frame which is not the response frame may use the AIFS [AC] of the AC of the transmitted frame.

A WLAN device may perform a backoff procedure when the WLAN device that is ready to transfer a frame finds the medium busy. In addition, a WLAN device operating according to the IEEE 802.11n and 802.11ac standards may perform the backoff procedure when the WLAN device infers that a transmission of a frame by the WLAN device has failed.

The backoff procedure includes determining a random backoff time composed of N backoff slots, each backoff slot having a duration equal to a slot time and N being an integer number greater than or equal to zero. The backoff time may be determined according to a length of a Contention Window (CW). In an embodiment, the backoff time may be determined according to an AC of the frame. All backoff slots occur following a DIFS or Extended IFS (EIFS) period during which the medium is determined to be idle for the duration of the period.

When the WLAN device detects no medium activity for the duration of a particular backoff slot, the backoff procedure shall decrement the backoff time by the slot time. When the WLAN determines that the medium is busy during a backoff slot, the backoff procedure is suspended until the medium is again determined to be idle for the duration of a DIFS or EIFS period. The WLAN device may perform transmission or retransmission of the frame when the backoff timer reaches zero.

The backoff procedure operates so that when multiple WLAN devices are deferring and execute the backoff procedure, each WLAN device may select a backoff time using a random function, and the WLAN device selecting the smallest backoff time may win the contention, reducing the probability of a collision.

Figure 5:
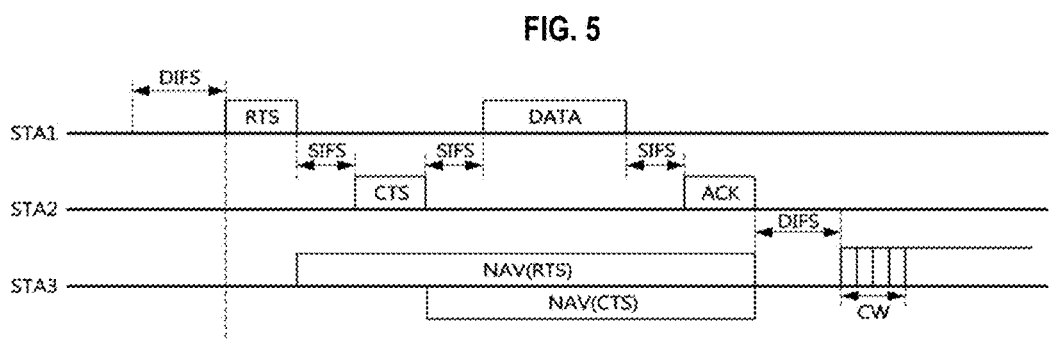
FIG. 5 illustrates a Carrier Sense Multiple Access/Collision Avoidance (CSMA/CA) based frame transmission procedure.

FIG. 5 illustrates a Carrier Sense Multiple Access/Collision Avoidance (CSMA/CA) based frame transmission procedure for avoiding collision between frames in a channel according to an embodiment. FIG. 5 shows a first station STA1 transmitting data, a second station STA2 receiving the data, and a third station STA3 that may be located in an area where a frame transmitted from the STA1, a frame transmitted from the second station STA2, or both can be received. The stations STA1, STA2, and STA3 may be WLAN devices.

The STA1 may determine whether the channel is busy by carrier sensing. The STA1 may determine the channel occupation based on an energy level in the channel or an autocorrelation of signals in the channel, or may determine the channel occupation by using a network allocation vector (NAV) timer.

After determining that the channel is not used by other devices (that is, that the channel is IDLE) during a DIFS (and performing backoff if required), the STA1 may transmit a Ready-To-S end (RTS) frame to the second station STA2. Upon receiving the RTS frame, after a SIFS the second station STA2 may transmit a Clear-To-Send (CTS) frame as a response of the RTS frame. If Dual-CTS is enabled and the second station STA2 is an AP, the AP may send two CTS frames in response to the RTS frame: a first CTS frame in the legacy non-HT format, and a second CTS frame in the HT format.

When the third station STA3 receives the RTS frame, it may set a NAV timer of the third station STA3 for a transmission duration of subsequently transmitted frames (for example, a duration of SIFS+CTS frame duration+SIFS+data frame duration+SIFS+ACK frame duration) using duration information included in the RTS frame. When the third station STA3 receives the CTS frame, it may set the NAV timer of the third station STA3 for a transmission duration of subsequently transmitted frames using duration information included in the CTS frame. Upon receiving a new frame before the NAV timer expires, the third station STA3 may update the NAV timer of the third station STA3 by using duration information included in the new frame. The third station STA3 does not attempt to access the channel until the NAV timer expires.

When the STA1 receives the CTS frame from the second station STA2, it may transmit a data frame to the second station STA2 after SIFS elapses from a time when the CTS frame has been completely received. Upon successfully receiving the data frame, the second station STA2 may transmit an ACK frame as a response of the data frame after SIFS elapses.

When the NAV timer expires, the third station STA3 may determine whether the channel is busy using the carrier sensing. Upon determining that the channel is not used by other devices during a DIFS after the NAV timer has expired, the third station STA3 may attempt to access the channel after a contention window according to a backoff process elapses.

When Dual-CTS is enabled, a station that has obtained a transmission opportunity (TXOP) and that has no data to transmit may transmit a CF-End frame to cut short the TXOP. An AP receiving a CF-End frame having a Basic Service Set Identifier (BSSID) of the AP as a destination address may respond by transmitting two more CF-End frames: a first CF-End frame using Space Time Block Coding (STBC) and a second CF-End frame using non-STBC. A station receiving a CF-End frame resets its NAV timer to 0 at the end of the PPDU containing the CF-End frame.

FIG. 5 shows the second station STA1 transmitting an ACK frame to acknowledge the successful reception of a frame by the recipient.

The PHY entity for IEEE Std 802.11 is based on Orthogonal Frequency Division Multiplexing (OFDM) or Orthogonal Frequency Division Multiple Access (OFDMA). In either OFDM or OFDMA Physical (PHY) layers, a STA is capable of transmitting and receiving PHY Protocol Data Units (PPDUs) that are compliant with the mandatory PHY specifications.

A PHY entity may provide support for 20 MHz, 40 MHz, 80 MHz, and 160 MHz contiguous channel widths and support for an 80+80 MHz non-contiguous channel width. Each channel includes a plurality of subcarriers, which may also be referred to as tones.

A PHY entity may define fields denoted as Legacy Signal (L-SIG), Signal A (SIG-A), and Signal B (SIG-B) within which some necessary information about PHY Service Data Unit (PSDU) attributes are communicated. For example, a High Efficiency (HE) PHY entity may define an L-SIG field, an HE-SIG-A field, and an HE-SIG-B field.

The descriptions below, for sake of completeness and brevity, refer to OFDM-based 802.11 technology. Unless otherwise indicated, a station refers to a non-AP HE STA, and an AP refers to an HE AP.

In the IEEE Std 802.11ac, SIG-A and SIG-B fields are called VHT SIG-A and VHT SIG-B fields. Hereinafter, IEEE Std 802.11ax SIG-A and SIG-B fields are respectively referred to as HE-SIG-A and HE-SIG-B fields.

FIG. 6A illustrates an HE PPDU 600 according to an embodiment. A transmitting station generates the HE PPDU frame 600 and transmits it to one or more receiving stations. The receiving stations receive, detect, and process the HE PPDU frame 600.

The HE PPDU frame 600 includes a Legacy Short Training Field (L-STF) field 602, a Legacy (i.e., a Non-High Throughput (Non-HT)) Long Training Field (L-LTF) 604, a Legacy Signal (L-SIG) field 606, and a Repeated L-SIG field (RL-SIG) 608, which together comprise a legacy preamble 601. The L-STF 604 of a non-trigger-based PPDU has a periodicity of 0.8 us with 10 periods.

The HE PPDU frame 600 also includes an HE-SIG-A field 610, an optional HE-SIG-B field 612, an HE-STF 614, an HE-LTF 616, and an HE-Data field 618.

The legacy preamble 601, the HE-SIG-A field 610, and the HE-SIG-B field 612 when present, comprise a first part of the HE PPDU frame 600. In an embodiment, the first part of the HE PPDU frame 600 is decoded using a 64-element Discrete Fourier Transform (DFT), having a basic subcarrier spacing of 312.5 KHz.

The HE-SIG-A field 610 is duplicated on each 20 MHz segment after the legacy preamble to indicate common control information. The HE-SIG-A field 610 includes a plurality of OFDM HE-SIG-A symbols 620 each having a duration (including a Guard Interval (GI)) of 4 μs. A number of the HE-SIG-A symbols 620 in the HE-SIG-A field 610 is indicated by NHESIGA and is either 2 or 4.

The HE-SIG-B field 612 is included in Down-Link (DL) Multi-User (MU) PPDUs. The HE-SIG-B field 612 includes a plurality of OFDM HE-SIG-B symbols 622 each having a duration including a Guard Interval (GI) of 4 μs. In embodiments, Single User (SU) PPDUs, Up-Link (UL) MU PPDUs, or both do not include the HE-SIG-B field 612. A number of the HE-SIG-B symbols 622 in the HE-SIG-B field 612 is indicated by NHESIGB and is variable.

When the HE PPDU 600 has a bandwidth of 40 MHz or more, the HE-SIG-B field 612 may be transmitted in first and second HE-SIG-B channels 1 and 2. The HE-SIG-B field in the HE-SIG-B channel 1 is referred to as the HE-SIG-B1 field, and the HE-SIG-B field in the HE-SIG-B channel 2 is referred to as the HE-SIG-B2 field. The HE-SIG-B1 field and the HE-SIG-B2 field are communicated using different 20 MHz bandwidths of the HE PPDU 600, and may contain different information. Within this document, the term "HE-SIG-B field" may refer to an HE-SIG-B field of a 20 MHz PPDU, or to either or both of an HE-SIG-B1 field or HE-SIG-B2 field of a 40 MHz or more PPDU.

An HE-STF 614 of a non-trigger-based PPDU has a periodicity of 0.8 μs with 5 periods. A non-trigger-based PPDU is a PPDU that is not sent in response to a trigger frame. An HE-STF 614 of a trigger-based PPDU has a periodicity of 1.6 μs with 5 periods. Trigger-based PPDUs include UL PPDUs sent in response to respective trigger frames.

The HE-LTF 616 includes one or more OFDM HE-LTF symbols 626 each having a duration of 12.8 μs plus a Guard Interval (GI). The HE PPDU frame 600 may support a 2×LTF mode and a 4×LTF mode. In the 2×LTF mode, an HE-LTF symbol 626 excluding a Guard Interval (GI) is equivalent to modulating every other tone in an OFDM symbol of 12.8 μs excluding the GI, and then removing the second half of the OFDM symbol in a time domain. A number of the HE-LTF symbols 626 in the HE-LTF field 616 is indicated by NHELTF, and is equal to 1, 2, 4, 6, or 8.

The HE-Data field 618 includes one or more OFDM HE-Data symbols 628 each having a duration of 12.8 μs plus a Guard Interval (GI). A number of the HE-Data symbols 628 in the HE-Data field 618 is indicated by NDATA and is variable.

FIG. 6B shows a Table 1 indicating additional properties of the fields of the HE PPDU frame 600 of FIG. 6A, according to an embodiment.

The descriptions below, for sake of completeness and brevity, refer to OFDMA-based 802.11 technology. Unless otherwise indicated, a station refers to a non-AP HE STA, and an AP refers to an HE AP.

Embodiments include a station of an HE WLAN system, wherein the station maintains two NAV values. The station maintains an Intra-BSS NAV, which may be referred to as $NAV_{intra-BSS}$, managed according to frames that are identified as intra-BSS frames, and an Inter-BSS NAV, which may be referred to as $NAV_{inter-BSS}$, managed according to frames that are identified as inter-BSS frames or that cannot be determined to be intra-BSS or inter-BSS frames.

Some frames, such as legacy Clear-to-Send (CTS) frames and legacy Acknowledgment (ACK) frames, do not contain a transmitter address (TA) identifying the sender of the frame or an identifier of the BSS that the sender of the frame is associated with. A station receiving such frames may not be able to determine whether they are intra-BSS frames or intra-BSS frames based on the lack of this information in the frame. As a result, in some circumstances, a station receiving such frames cannot determine whether the $NAV_{inter-BSS}$ or the $NAV_{intra-BSS}$ is the correct NAV to update.

Since the Inter-BSS NAV $NAV_{inter-BSS}$ could therefore on occasion be set or updated by an intra-BSS frame, there may be some unintended procedures that cause the HE WLAN to operate less efficiently than otherwise would be the case.

The distributed nature of channel access networks, such as IEEE 802.11 WLANs, makes the carrier sense mechanism important for reducing a number of collisions occurring in the WLAN. The physical carrier sense of one STA is responsible for detecting the transmissions of other STAs. But it may be impossible to detect every single case in some circumstances. For example, a first STA that is a large distance away from a second STA may see the medium as idle even though the second STA (known as the "hidden node") is transmitting to an AP. As a result the first STA may begin transmitting to the AP. The transmissions of the first and second STAs may then collide at the AP, causing one or both transmissions to fail.

A NAV (Network Allocation Vector) is used in the IEEE 802.11 standards to overcome this "hidden node" problem by providing a "virtual carrier sense" capability. However, as the IEEE 802.11 standard evolves to include multiple users' simultaneous transmission/reception scheduled within a BSS (such as UL/DL multi-user (MU) transmissions performed in a cascading manner), it may be advantageous to use a modified or newly defined mechanism for virtual carrier sensing.

As used herein, an MU transmission refers to transmissions in which multiple frames are transmitted to or from multiple STAs simultaneously using different resources. Examples of different resources include different frequency resources in an OFDMA transmission and different spatial streams in an MU MIMO transmission. DL OFDMA transmissions, DL MU-MIMO transmissions, UL OFDMA transmissions, and UL MU-MIMO transmissions are examples of MU transmissions.

As used herein, a transmission or frame is targeted or addressed to a station when the transmission or frame includes in a receiver address field a receiver address of the station.

The IEEE 802.11ax standard currently being drafted supports DL MU transmissions and UL MU transmissions. UL MU PPDUs (MU-MIMO or OFDMA) are sent as a response to a Trigger frame transmitted by the AP. The trigger frame may have enough station-specific information and assigned resource units to identify the stations which are to participate in the UL MU PPDUs. In addition, the IEEE 802.11ax standard may include mechanisms for efficiently multiplexing acknowledgements transmission in response to a DL or UL MU PPDU.

Figure 7:
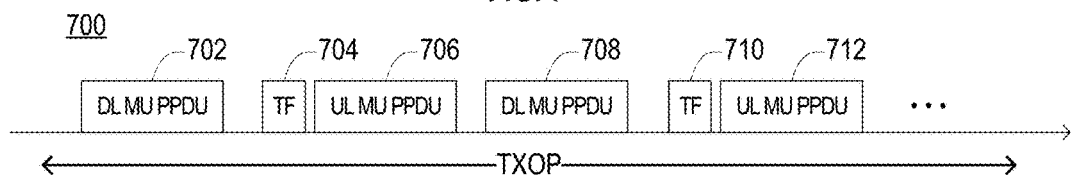
FIG. 7 illustrates communications of a BSS during a Transmission Opportunity (TXOP), according to an embodiment.

FIG. 7 illustrates communications of a BSS during a Transmission Opportunity (TXOP), according to an embodiment. In an embodiment, the TXOP is a TXOP in a Target Wake Time (TWT) Service Period.

During the TXOP, an AP transmits a first DL MU PPDU 702 and a first Trigger Frame 704. The first Trigger Frame 704 includes a cascade indicator indicating that the AP will transmit another trigger frame within the TXOP. The first Trigger Frame 704 indicates a first set of one or more stations. In an embodiment, the first Trigger Frame 704 is included in the first DL MU PPDU 702.

In response to the first Trigger Frame 704, the first set of one or more stations transmit a first UL MU PPDU 706.

The AP then transmits a second DL MU PPDU 708 and a second Trigger Frame 710. The Trigger Frame 710 indicates a second set of one or more stations. In an embodiment, the second Trigger Frame 710 includes a cascade indicator indicating that the AP will transmit another trigger frame within the TXOP. In an embodiment, the second Trigger Frame 710 is included in the second DL MU PPDU 708.

In response to the second Trigger Frame 710, the second set of one or more stations transmit a second UL MU PPDU 712. The second set of stations may include zero or more stations from the first set of stations and may include zero or more stations not included in the first set of stations.

The cascading of DL MU transmissions and UL MU transmissions within a TXOP, such as shown in FIG. 1, allows an AP and its associated stations opportunities to exchange multiple types of frames efficiently and quickly to support MU transmission.

To increase system throughput, the IEEE 802.11ax standard currently being drafted has increased a Clear Channel Assessment (CCA) threshold value to enable more aggressive channel access. However, increasing the CCA threshold value may result in more frequent packet collision and degradation of a Quality of Service (QoS) of packet delivery. However, if a first station assesses the wireless medium and a frame that occupies the wireless medium is between a second station and an AP of the BSS that the first station is associated with, then even if the CCA threshold value is increased enough to permit the first station to initiates transmission to the AP, the transmission will not be successful because the AP is currently in the middle of transmission/reception with the second station.

Therefore, it may be advantageous to indicate CCA related information, spatial reuse related information, or both in the physical layer header of a frame so that stations that identify a start of a frame can utilize the CCA or spatial reuse related information in determining whether to adjust CCA threshold value.

One example of indicating spatial reuse related information in a physical layer header is a Color field of a frame. Color field is partial BSS information regarding which BSS a transmitter of a frame belongs to. When a station identifies a start of a frame as part of wireless medium assessment operation, the station checks the Color field of the frame. If the Color field indicates a same Color as the Color of the BSS that the station is associated with (i.e., the Color of the station), the stations assesses the wireless medium as BUSY. However, if the Color field indicates a different Color than the Color of the station, the station compares a received signal strength of the frame with a first threshold (for example, an OBSS PD level), and assesses the wireless medium as BUSY only if the received signal strength is above the first threshold.

Under the current rules for HE WLAN systems, a STA maintains two different NAVs. The first is a NAV ($NAV_{intra-BSS}$) for intra-BSS frames, while the second is a NAV ($NAV_{inter-BSS}$) for inter-BSS frame or frames that a station is unable to determine to be an Intra-BSS or Inter-BSS frame.

A station may be unable to determine whether a frame is an Intra-BSS or Inter-BSS frame because there is no valid BSS information (such as a Color field in a PHY field or a MAC address in a MAC field) to classify the frame as originating in the BSS that the station is associated with (said BSS referred to hereinafter as myBSS).

Figure 8:
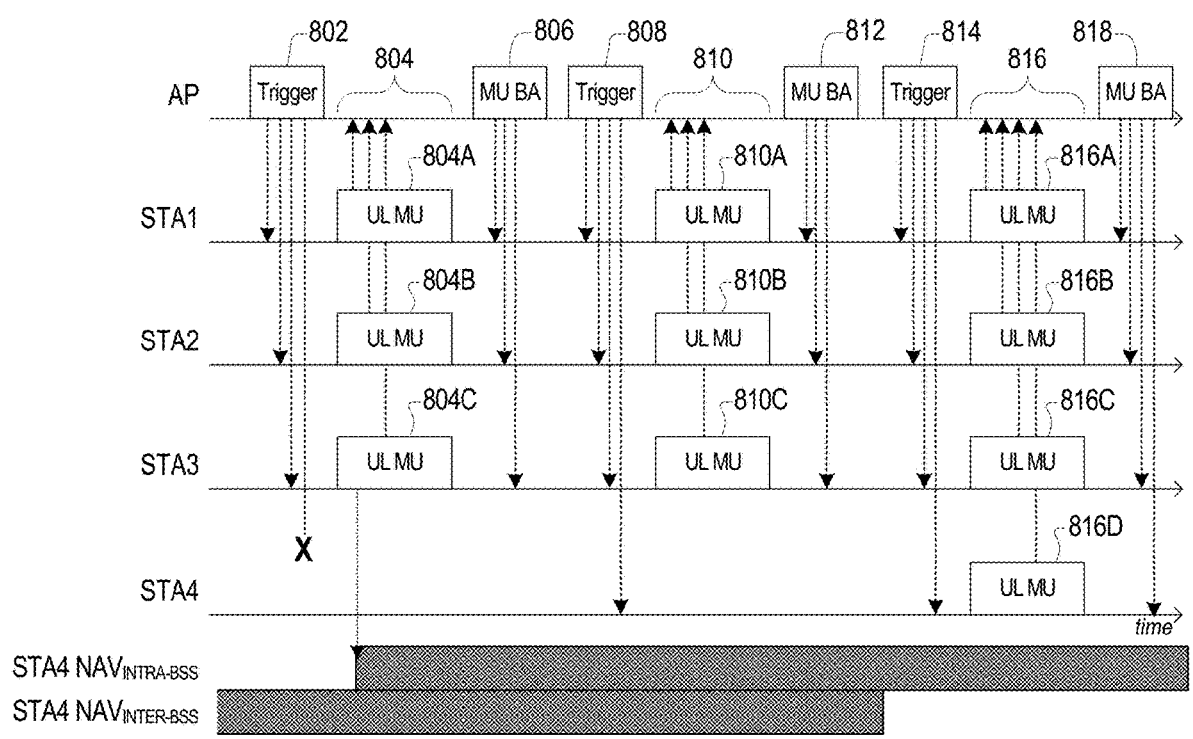
FIG. 8 illustrates operation of a station having two NAVs during cascaded UL MU operations, according to an embodiment.

FIG. 8 illustrates operation of a station having two NAVs during UL MU operations, according to an embodiment. The operations are performed by an Access Point AP and first to fourth stations STA1 to STA4. The stations STA1 to STA4 are all associated with the BSS controlled by the AP.

In the example of FIG. 8, the fourth station STA4 had, in response to and using a value received in a prior Inter-BSS frame, already set an Inter-BSS NAV $NAV_{inter-BSS}$ of the fourth station STA4 before the AP transmitted a first Trigger frame 802.

The AP transmits a first Trigger frame 802 soliciting the stations STA1, STA2, STA3, and STA4 in an UL MU manner. The stations STA1, STA2, and STA3 receive the first Trigger frame 802 but the fourth station STA4 does not. In response to receiving the first Trigger frame 802, the stations STA1, STA2, and STA3 participate in a first UL MU transmission 804 by respectively transmitting UL MU response frames 804A, 804B, and 804C to the AP. The AP then transmits a first MU Block ACK (BA) frame 806 in response to receiving the first UL MU transmission 804.

The fourth station STA4 receives one or more of the UL MU response frames 804A, 804B, and 804C and determines, based on a Color field or a MAC address of the received transmission, that the received one or more of the UL MU response frames 804A, 804B, and 804C are from the myBSS of the fourth station STA4. The fourth station STA4 therefore sets an Intra-BSS NAV NAVintra-BSS of the fourth station STA4 with the value of a TXOP duration field of the received transmission.

FIG. 8 illustrates a cascaded operation wherein the AP transmits a second Trigger frame 808 after transmitting the first MU BA frame 806. The second Trigger frame 808 indicates that the stations STA1, STA2, STA3, and STA4 are to participate in the upcoming second UL MU transmission 810.

The AP cannot override the Inter-BSS NAV NAVinter-BSS set by the fourth station STA4 in response to the prior-received inter-BSS frame. As a result, to protect the busy medium of the other BSS, the fourth STA4 is not allowed to participate in the second UL MU transmission 810 because the Inter-BSS NAV NAVinter-BSS set by the fourth station STA4 has not expired at a time at which the second UL MU transmission 810 is to be performed.

As a result, even though the fourth station STA4 receives the second Trigger frame 808 indicating that the fourth station STA4 is to participate in the second UL MU transmission 810, the fourth station STA4 does not participate in the second UL MU transmission 810.

In response to the second Trigger frame 808, the first, second, and third stations STA1, STA2, and STA3 participate in the second UL MU transmission 810 by respectively transmitting UL MU response frames 810A, 810B, and 810C. The AP then transmits a second MU Block ACK (BA) frame 812 in response to receiving the second UL MU transmission 810.

The AP transmits a third Trigger frame 814 after transmitting the second MU BA frame 812. The third Trigger frame 814 indicates that the stations STA1, STA2, STA3, and STA4 are to participate in the upcoming third UL MU transmission 816.

Because the Inter-BSS NAV NAVinter-BSS of the fourth station STA4 has expired before the time for the third UL MU transmission 816, and the Intra-BSS NAV NAVintra-BSS being set does not prevent the fourth station STA4 from responding to a trigger frame from the AP of the BSS it is associated with, the fourth station STA4 is allowed to participate in the third UL MU transmission 816.

Accordingly, in response to the third Trigger frame 814, the first, second, third, and fourth stations STA1, STA2, STA3, and STA4 participate in the third UL MU transmission 816 by respectively transmitting UL MU response frames 816A, 816B, 816C, and 816D. The AP then transmits a third MU Block ACK (BA) frame 818 in response to receiving the third UL MU transmission 816.

However, when the Inter-BSS NAV NAVinter-BSS is set or updated by a frame that cannot be determined to be an inter-BSS or inter-BSS frame, there may be unintended and unnecessary restrictions on station transmission which could happen frequently in a HE WLAN system and produce a performance loss.

Figure 9A:
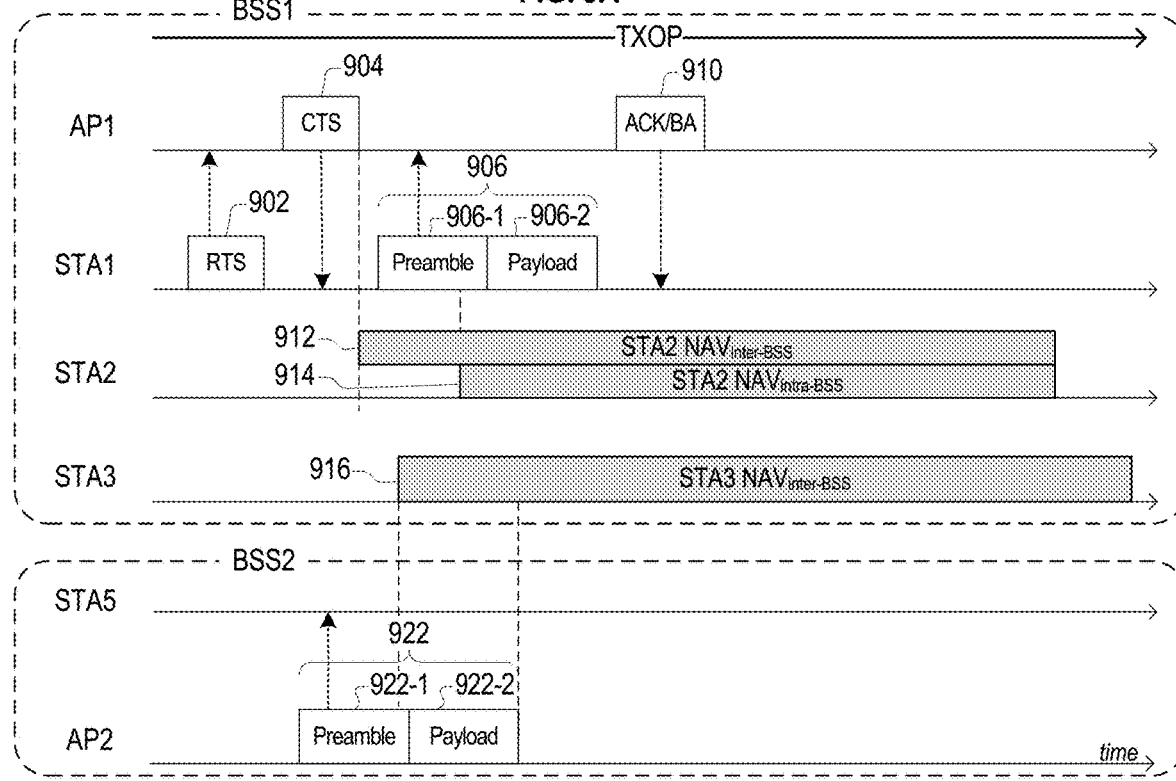
FIG. 9A illustrates operations of NAVs in first and second BSSs BSS1 and BSS2, according to an embodiment.

FIG. 9A illustrates operations of NAVs in first and second BSSs BSS1 and BSS2, according to an embodiment. The first BSS BSS1 includes a first AP AP1 and first, second, and third stations STA1, STA2, and STA3. The second BSS BSS2 includes a second AP AP2 and a fifth station STA5.

In the example of FIG. 9A, the third station STA3 is in an OBSS area where it may receive frames transmitted by devices in the first BSS BSS1 and may receive frames transmitted by devices in the second BSS BSS2. Therefore, when, in the second BSS BSS2, the second AP AP2 and the fifth station STA 5 exchanges frames in sequence, the third station STA3 can detect those frames because the third station STA3 is close to the second AP AP2 and the fifth station STA5 in distance.

in the example of FIG. 9A, the first station STA1 is a TXOP holder of the first BSS BSS1. Accordingly, the first station STA1 as the TXOP holder starts a protection mechanism by sending an RTS frame 902 to the first AP AP1. The first AP AP1 transmits a CTS frame 904 in response to receiving the RTS frame 902. After the RTS/CTS sequence exchange, operations in the first BSS BSS1 are contiguous within a TXOP.

In the second BSS BSS2, the second AP transmits a frame 922 including a first preamble 922-1 and a first payload 922-2.

The second and third stations STA2 and STA3 of the first BSS BSS1 are untargeted stations. In the example shown in FIG. 9A, the second station STA2 receives the CTS frame 904 but not the RTS frame 902. The third station STA3 receives the first preamble 922-1 and the first payload 922-2 but does not receive the RTS frame 902 or the CTS frame 904.

In response to receiving the CTS frame 904, the second station STA2 sets a NAV in response to receiving the CTS frame 904, using duration information in the CTS frame 904. However, because the CTS frame does not include an indication that it was transmitted from a device in the first BSS BSS1—such as a Transmitter Address (TA) or a Color the second station STA2 sets its Inter-BSS NAV NAVinter-BSS 912 even though CTS frame 904 is an intra-frame.

Subsequently, the second station STA2 receives the second preamble 906-1 and the second payload 906-2 of a frame 906 transmitted by the second station STA1. The second station STA2 determines that the frame 906 is an intra-BSS frame using a TA included in the second payload 906-2 or Color included in the second preamble 906-1. As a result, the second station STA2 sets its Intra-BSS NAV $NAV_{intra-BSS}$ 914 using duration information in the second preamble 906-1 when the second preamble 906-1 is valid.

The third station STA3 receives the first preamble 922-1 and the first payload 922-2, identifies them as corresponding to an Inter-BSS frame 922 using Color included in the second preamble 922-1 and sets its Inter-BSS NAV $NAV_{inter-BSS}$ 916 using duration information in the first preamble 922-1 when the second preamble 922-1 is valid.

In response to receiving the second preamble 906 and the second payload 906, the first AP AP1 transmits an ACK or BA frame 910 to the first station STA1.

Figure 9B:
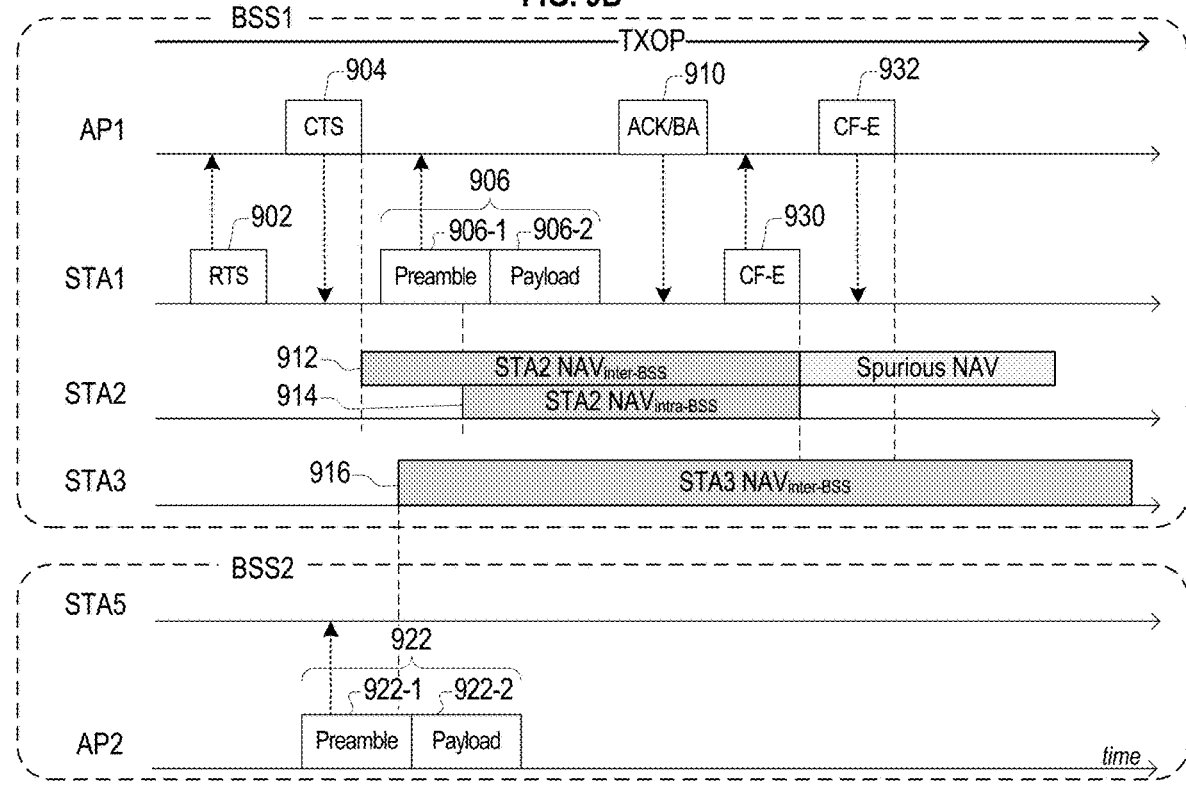
FIG. 9B further illustrates operations of NAVs in first and second BSSs BSS1 and BSS2, according to an embodiment.

FIG. 9B further illustrates operations for the example of FIG. 9A, according to an embodiment.

In FIG. 9B when the operations described for FIG. 9A are complete, the first station STA1 doesn't have any more data queued for transmission. Accordingly, the first station STA1 transmits a first CF-End frame 930 indicating that as the holder of the TXOP, the first station STA1 is explicitly indicating the completion of its TXOP. A station shall respond to the reception of a CF-End frame as a $NAV_{intra-BSS}$ reset. For example, the second station STA2 resets its Intra-BSS NAV $NAV_{intra-BSS}$ 912 to 0 at the end of the PPDU containing the first CF-End frame 930.

In response to receiving the first CF-End frame 930, the first AP AP1 may broadcast a second CF-End frame 932 to every station listed as being in the first BSS BSS1.

The reception of the CF-End frames does not cause the second station STA2 to reset the Inter-BSS NAV $NAV_{inter-BSS}$ 914 that was set by the CTS frame 904. As a result, the second station STA2 is spuriously prevented from transmitting because the second station STA2 was unable to determine that the CTS frame 904 was an intra-BSS frame.

The reception of a CF-End frame also does not cause the third station STA3 to reset the Inter-BSS NAV $NAV_{inter-BSS}$ 916 set by the frame 922. This protects the TXOP of the second BSS BSS2 from interference from the third station STA3, which is in the OBSS area.

Figure 9C:
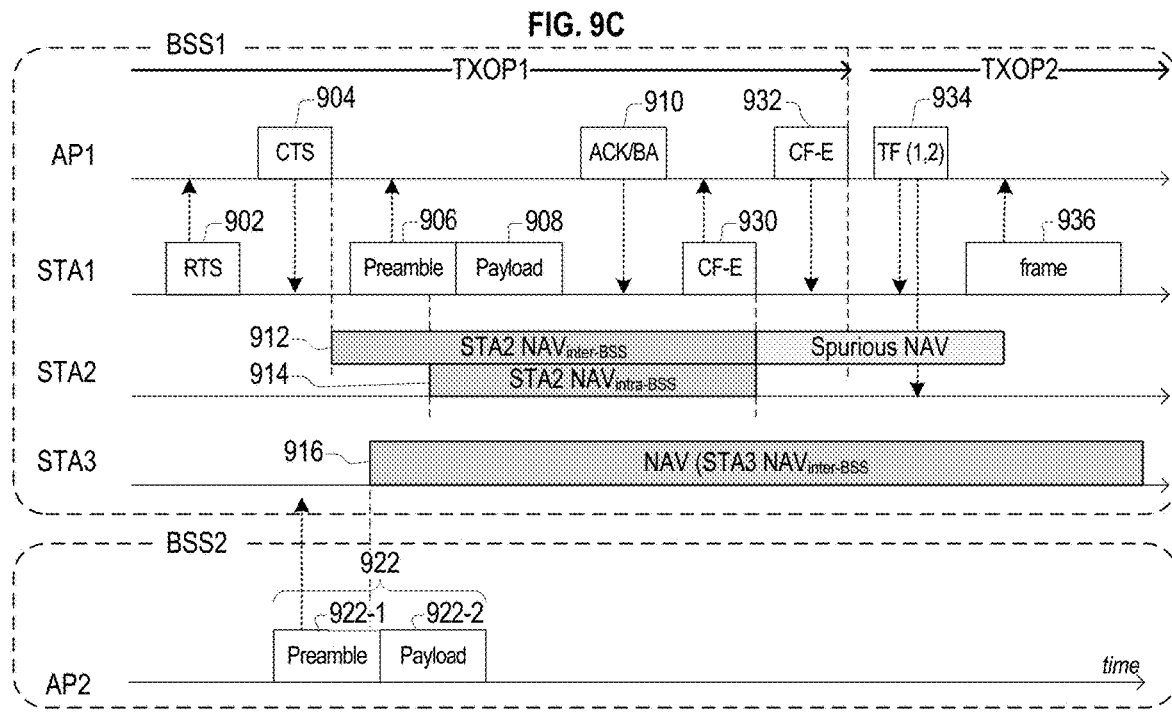
FIG. 9C further illustrates operations of NAVs in first and second BSSs BSS1 and BSS2, according to an embodiment.

FIG. 9C further illustrates operations for the example of FIGS. 9A and 9B, according to an embodiment.

After transmitting the second CF-End frame 932, the first AP AP1 is the holder of a new TXOP TXOP2 and transmits a trigger frame 934. The trigger frame 934 directs the first and second stations STA1 and STA2 to transmit UL MU frames.

In response to the trigger frame 934, the first station STA1 transmits a frame 936.

However, because the Inter-BSS NAV $NAV_{inter-BSS}$ of the second station STA2 912 is still set, as previously explained with respect to FIG. 8, the second station STA2 is prohibited from responding to the trigger frame 934.

A similar reduction in potential performance can occur because even though an RTS frame or data frame is available to receive correctly, a station may update its Inter-BSS NAV $NAV_{inter-BSS}$ with a value of a valid duration field in a received legacy CTS frame or a received legacy ACK frame where technically there is no TA or valid BSS information.

Embodiments include methods for reducing the occurrence of an Inter-BSS NAV $NAV_{inter-BSS}$ being set by an intra-BSS frame, in order to improve WLAN performance. For example, embodiments may store a TA from an intra-BSS frame, and may compare the stored TA to addresses in subsequent frames. Embodiments may determine that subsequent frames are intra-BSS frames when addresses in the subsequence frame respectively match the stored TA.

Figure 10:
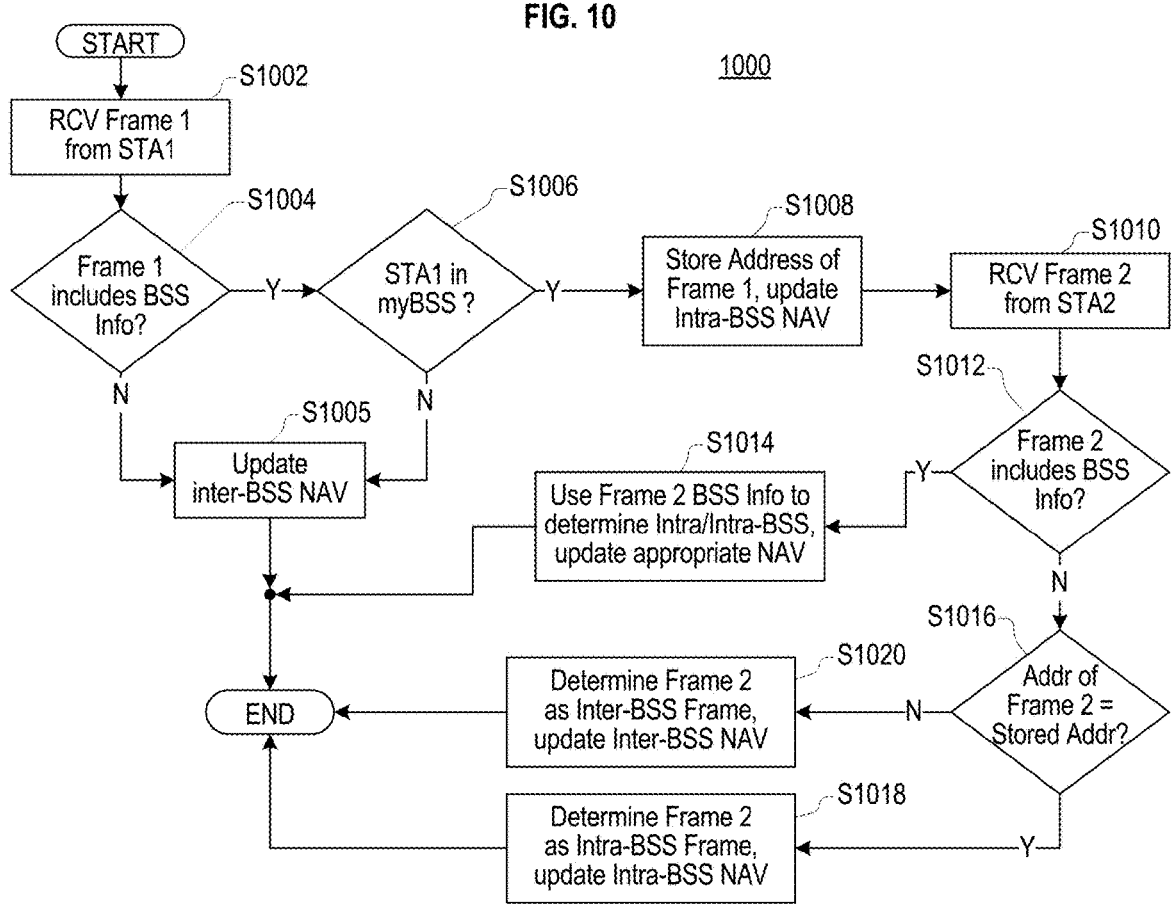
FIG. 10 illustrates a process for determining whether a frame is an Inter-BSS or Intra-BSS frame, according to an embodiment.

FIG. 10 illustrates a process 1000 for determining whether a frame is an Inter-BSS frame or an Intra-BSS frame, according to an embodiment. The process 1000 may be performed by one or more of the first to fifth stations STA1 to STA5 of FIG. 1.

At S1002, a station (STA0) performing the process 1000 receives, over a shared wireless medium, a first frame (frame 1) from a first station (STA1). The frame was addressed to a station other than STA0, but STA0 detected the frame on the shared wireless medium. In an embodiment, the first frame is an RTS frame or a data frame.

In an embodiment, the first station is a non-AP station.

At S1004, the process 1000 determines whether the first frame includes valid BSS information, that is, information that can be used to determine whether the frame was transmitted by a device associated with a particular BSS. In an embodiment, BSS information includes Color information corresponding to a color of a BSS (i.e., a shortened BSS identifier), an address of a device (such as a MAC address) that can be used to determine whether the device is associated with the BSS, or both.

At S1004, when the process 1000 determines that the first frame does include valid BSS information, the process 1000 proceeds to S1006; and when the process 1000 determines that the first frame does not include valid BSS information, the process 1000 proceeds to S1005.

At S1005, the process 1000 updates an inter-BSS NAV using duration information included in the first frame, and the process 1000 ends.

At S1006, the process 1000 determines, using the BSS information of the first frame, whether the first station, which transmitted the first frame, is associated with a same BSS (myBSS) that the station STA0 performing the process 1000 is associated with; that is, whether the first station is in myBSS. When the process 1000 determines that the first station is in myBSS, the process 1000 proceeds to S1008; and when the process 1000 determines that the first station is not in myBSS, the process 1000 proceeds to S1005.

At S1008, the process 1000 stores an address of the first frame as a stored address. In an embodiment, the address of the first frame is a transmitter address (TA) corresponding to the first station. In an embodiment, at S1008 the process 1000 updates an intra-BSS NAV using the duration information included in the first frame.

At S1010, the station STA0 performing the process 1000 receives a second frame (frame 2) from a second station (STA2). The frame was addressed to a station other than STA0, but STA0 detected the frame on the shared wireless medium. In an embodiment, the second station is different from the first station. In an embodiment, the second station is an AP.

In an embodiment, the process 1000 receives the second frame within a Short Inter-Frame Spacing (SIFS) of the end of the first frame or within a duration of a frame exchange that includes the first and second frames.

In an embodiment, the second frame is a CTS or ACK frame having a legacy format. In an embodiment, the second frame is a CTS or ACK frame having a non-HE format.

At S1012, the process 1000 determines whether the second frame includes valid BSS information. When the process 1000 determines that the second frame does include valid BSS information, the process 1000 proceeds to S1014. When the process 1000 determines that the second frame does not include valid BSS information, the process 1000 proceeds to S1016.

At S1014, the process 1000 determines whether the second station is in myBSS using the BSS information of the second frame. When the second station is determined to be in the myBSS, the process 1000 determines that the second frame is an intra-BSS frame. Otherwise, the process 1000 determines that the second frame is an inter-BSS frame.

In an embodiment, at S1014 the process 1000, using duration information included in the second frame, updates the inter-BSS NAV when the process 1000 determines that the second frame is an inter-BSS frame and updates the intra-BSS NAV when the process 1000 determines that the second frame is an intra-BSS. The process 1000 then ends.

At S1016, the process 1000 determines whether an address of the second frame is the same as the stored address. In an embodiment, the address of the second frame is a receiver address (RA) indicating an intended receiver of the second frame.

At S1016, when the address of the second frame is the same as the stored address, the process 1000 proceeds to S1018; otherwise the process 1000 proceeds to S1020.

At S1018, the process 1000 determines that the second frame is an intra-BSS frame. In an embodiment, at S1018 the process 1000 updates the intra-BSS NAV using duration information included in the second frame. The process 1000 then ends.

At S1020, the process 1000 determines that the second frame is an inter-BSS frame. In an embodiment, at S1020 the process 1000 updates the inter-BSS NAV using duration information included in the second frame. The process 1000 then ends.

In an embodiment, a station determines that a frame received by the station is an intra-BSS frame when one or more of the following conditions is true:

An RXVECTOR parameter BSS_COLOR of a received PPDU carrying the frame is the same as a BSS color announced by the AP to which the station is associated, The RA field, TA field, or BSSID field of the received frame with the Individual/Group bit forced to the value 0 is the same as the BSSID of AP to which the station is associated, The AP to which the station is associated is a member of a Multiple BSSID Set with two or more members and the RA field, TA field, or BSSID field of the received frame with the Individual/Group bit forced to the value 0 is same as the BSSID of any member of the Multiple BSSID Set, The RXVECTOR parameter PARTIAL_AID in a received VHT PPDU with the RXVECTOR parameter GROUP_ID equal to 0 is the same as the BSSID[39:47] of the AP to which the station is associated, The value of RXVECTOR parameter PARTIAL_AID [8−N+1:8] in the received VHT PPDU with the RXVECTOR parameter GROUP_ID equal to 63 is the same as the Partial BSS Color announced by the AP to which the station is associated when the value (N) of the Partial BSS Color Length field in the most recently received HE Operation element is not equal to 0, or The frame is a control (response) frame that does not have TA field, and the RA address matches the saved TXOP holder address for the BSS in which it is associated.

In an embodiment, the RXVECTOR parameter BSS_COLOR of the received PPDU is determined according to a BSS Color indication in an HE-SIG-A field of that PPDU.

In an embodiment, a station determines that a frame received by the station is an intra-BSS frame when the frame is a control (response) frame that does not have a Transmitter Address (TA) field, and a Receiver Address (RA) value of the frame matches a saved TXOP holder address for the BSS in which the station is associated.

In an embodiment, a station shall save a MAC address from the Address 2 field of a frame that initiates a frame exchange sequence as a TXOP holder address for the BSS in which the station is associated when the frame is not a CTS frame. The station shall save an Address 1 field of a frame that initiates a frame exchange sequence as a TXOP holder address for the BSS in which the station is associated when the frame is a CTS frame. The station shall save a nonbandwidth signaling TA value obtained from the Address 2 field of a frame that initiates a frame exchange sequence as a TXOP holder address for the BSS in which the frame is associated when the frame is a Control frame and the station is a VHT station or an HE station.

In an embodiment, when a station receives a first frame not targeted to the station, the first frame is considered as an intra-BSS frame when the first frame is a control (response) frame that does not have a TA field, and the RA address matches a saved TXOP holder address for the BSS in which it is associated.

In an embodiment, a station shall clear a saved TXOP holder address when an inter-BSS NAV of the station is reset, an Intra-BSS NAV of the station is reset, the inter-BSS NAV counts down to 0, or the Intra-BSS NAV counts down to 0.

FIG. 11 illustrates a process 1100 for determining whether a frame is an intra-BSS or inter-BSS frame, according to another embodiment. The process 1100 is similar to the process 1000 of FIG. 10, and elements of process 1100 perform similar function to similarly-numbers elements of the process 1000. For example, S1102 performs the same function as S1002, S1104 performs the same function as S1004, and so on.

The process 1100 differs from the process 1000 in that S1122 replaces S1008, S1124 and S1126 replace S1016, and S1128 replaces S1018. These new elements are described below.

At S1122, the process 1100 stores an address of the first frame as a stored address and in addition (compared to S1008 of FIG. 10) stores TXOP Duration information included in the first frame. In an embodiment, the address of the first frame is a transmitter address corresponding to the first station.

At S1124, the process 1100 determines whether an address of the second frame is the same as the stored address. In an embodiment, the address of the second frame is a receiver address (RA) indicating an intended receiver of the second frame.

At S1124, when the address of the second frame is the same as the stored address, the process 1100 proceeds to S1126; otherwise the process 1100 proceeds to S1120.

At S1126, the process 1100 compares TXOP duration information included in the second frame to the TXOP duration information stored at S1122. When an end of the TXOP indicated by the TXOP duration information included in the second frame matches an end of the TXOP indicated by the TXOP duration information stored at S1122, the process 1100 proceeds to S1128; otherwise the process 1100 proceeds to S1120.

At S1128, the process 1100 determines that the second frame is an intra-BSS frame and updates an intra-BSS NAV using the TXOP duration information included in the second frame. The process 1100 then ends.

In an embodiment, the MAC address of the TXOP holder could be an RA of the first frame. In an embodiment, xIFS could be a SIFS or a duration for several frame exchanges. In an embodiment, the first frame could be an RTS frame or data frame. In an embodiment, the second frame could be a CTS or ACK frame with a legacy format. In an embodiment, the second station could be an AP and the first station could be a non-AP station.

Figure 12A:
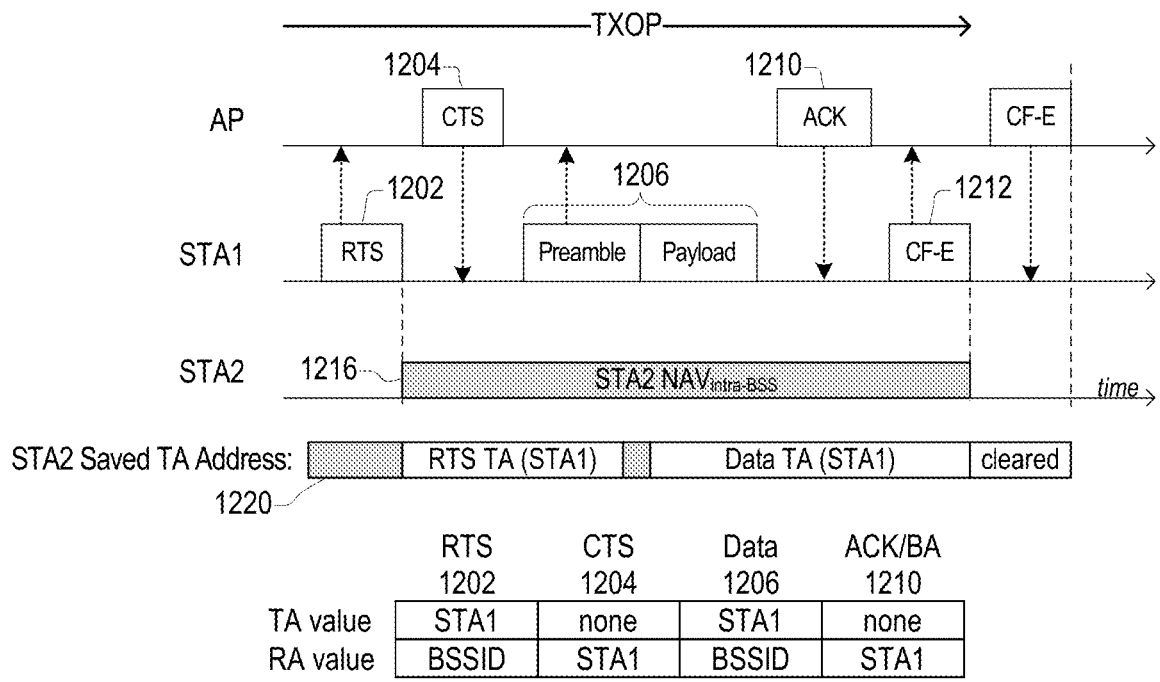
FIG. 12A illustrates a frame exchange and NAV operations related thereto, according to an embodiment.

FIG. 12A shows a frame exchange according to an embodiment. The frame exchange occurs between an AP and a first station STA1 and is observed by a second station STA2 that does not participate in the frame exchange. All of the AP, the first station STA1, and the second station STA2 are associated with a BSS having a BSS Identifier BSSID.

The first station STA1 holds a TXOP and transmits an RTS frame 1202 to the AP. The second station STA2 also receives the RTS frame 1202. The second station STA2, using the process 1000 of FIG. 10, determines that the RTS frame 1202 is an intra-BSS frame and as a result sets a STA2 Saved TA Address 1220 to the TA value of the RTS frame 1202 and sets a STA2 intra-BSS NAV 1216 using a duration signaled by the RTS frame 1202.

In response to the RTS frame 1202, the AP transmits a CTS frame 1204 to the first station STA1. The second station STA2 also receives the CTS frame 1204. The second station STA2, using the process 1000, determines that the CTS frame 1204 does not contain valid BSS information and therefore compares an RA address of the CTS frame 1204 to the STA2 Saved TA Address 1220. Because the RA address of the CTS frame 1204 matches the STA2 Saved TA Address 1220, the second station STA2, using the process 1000, determines that the CTS frame 1204 is an intra-BSS frame, updates the STA2 intra-BSS NAV 1216 using a duration signaled by the CTS frame 1204, and does not update a STA2 inter-BSS NAV.

In response to the CTS frame 1204, the first station STA1 transmits a data frame 1206 to the AP. The second station STA2 also receives the data frame 1206. The second station STA2, using the process 1000, determines that the data frame 1206 in an intra-BSS frame and as a result sets a STA2 Saved TA Address 1220 to the TA value of the data frame 1206 and updates the STA2 intra-BSS NAV 1216 using a duration signaled by the data frame 1206 when a value of the duration is larger than the current STA2 intra-BSS NAV.

In response to the data frame 1206, the AP transmits an ACK or BA frame 1210 to the first station STA1. The second station STA2 also receives the ACK or BA frame 1210. The second station STA2, using the process 1000, determines that the ACK frame 1210 does not contain valid BSS information and therefore compares an RA address of the ACK frame 1210 to the STA2 Saved TA Address 1220. Because the RA address of the ACK frame 1210 matches the STA2 Saved TA Address 1220, the second station STA2, using the process 1000, determines that the ACK frame 1210 is an intra-BSS frame, updates the STA2 intra-BSS NAV 1216 using a duration signaled by the ACK frame 1210, and does not update the STA2 inter-BSS NAV.

After receiving the ACK or BA frame 1210, the first station STA1 transmits a CF-End frame 1212 signaling an end of the TXOP. The second station STA2 also receives the CF-End frame 1212. In response to receiving the CF-End frame 1212, the second station STA2 resets the STA2 intra-BSS NAV 1216 and clears the STA2 Saved TA Address 1220.

Figure 12B:
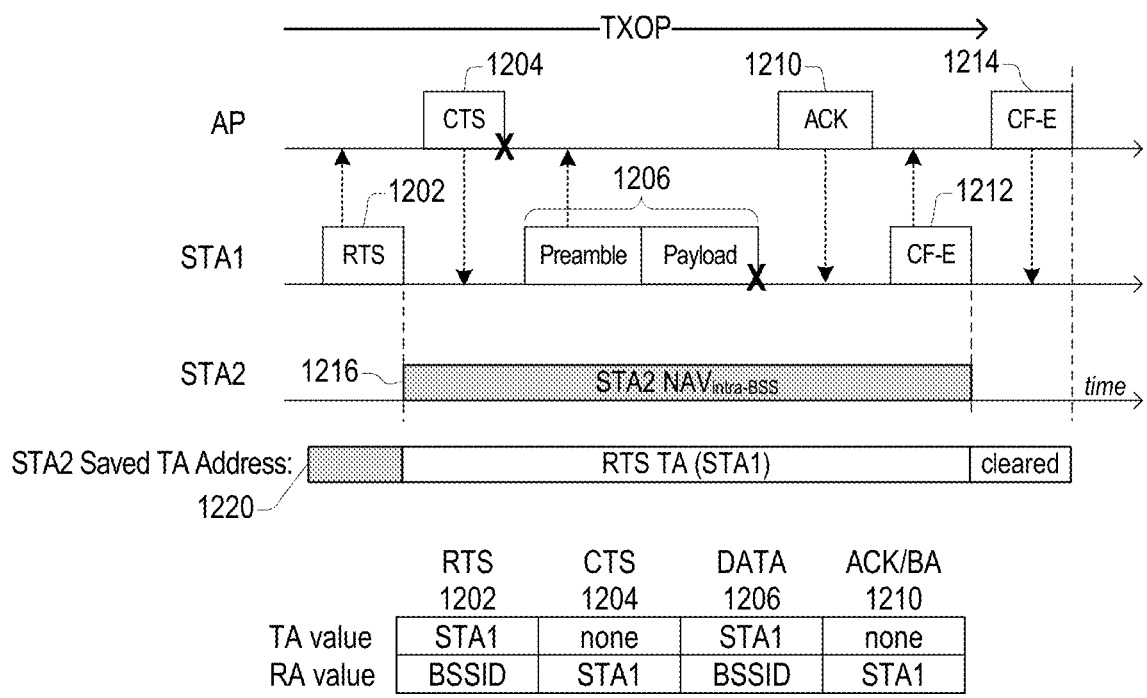
FIG. 12B illustrates another frame exchange and NAV operations related thereto, according to an embodiment.

FIG. 12B shows a frame exchange according to an embodiment. The frame exchange occurs between an AP and a first station STA1 and is observed by a second station STA2 that does not participate in the frame exchange. All of the AP, the first station STA1, and the second station STA2 are associated with a BSS having a BSS Identifier BSSID.

The frame exchange of FIG. 12B differs from the frame exchange of FIG. 12A in that the second station STA2 does not receive the CTS frame 1204 or the data frame 1206.

The first station STA1 holds a TXOP and transmits an RTS frame 1202 to the AP. The second station STA2 also receives the RTS frame 1202. The second station STA2, using the process 1000 of FIG. 10, determines that the RTS frame 1202 in an intra-BSS frame and as a result sets a STA2 Saved TA Address 1220 to the TA value of the RTS frame 1202 and sets a STA2 intra-BSS NAV 1216 using a duration signaled by the RTS frame 1202.

In response to the RTS frame 1202, the AP transmits a CTS frame 1204 to the first station STA1. The second station STA2 does not receives the CTS frame 1204, as indicated by the "X" on the CTS frame 1204 in FIG. 12B.

In response to the CTS frame 1204, the first station STA1 transmits a data frame 1206 to the AP. The second station STA2 does not receives the data frame 1206, as indicated by the "X" on the data frame 1206 in FIG. 12B.

In response to the data frame 1206, the AP transmits an ACK or BA frame 1210 to the first station STA1. The second station STA2 also receives the ACK or BA frame 1210. The second station STA2, using the process 1000, determines that the ACK frame 1210 does not contain valid BSS information and therefore compares an RA address of the ACK frame 1210 to the STA2 Saved TA Address 1220. Because the RA address of the ACK frame 1210 matches the STA2 Saved TA Address 1220, the second station STA2, using the process 1000, determines that the ACK frame 1210 is an intra-BSS frame, updates the STA2 intra-BSS NAV 1216 using a duration signaled by the ACK frame 1210, and does not update a STA2 inter-BSS NAV.

After receiving the ACK or BA frame 1210, the first station STA1 transmits a CF-End frame 1212 signaling an end of the TXOP. The second station STA2 also receives the CF-End frame 1212. In response to receiving the CF-End frame 1212, the second station STA2 resets the STA2 intra-BSS NAV 1216 and clears the STA2 Saved TA Address 1220.

FIG. 13 illustrates a process 1300 for determining whether a frame is an intra-BSS or inter-BSS frame, according to another embodiment. The process 1300 uses TXOP duration information to retroactively determine whether a frame was an inter-BSS or intra-BSS frame.

At S1302, the process 1300 receives, over a wireless medium, a first frame (frame 1) from a first station. In an embodiment, the first frame is a CTS frame or an ACK frame. In an embodiment, the first frame is not targeted to the station performing the process 1300.

In an embodiment, the first station is a non-AP station.

At S1304, the process 1300 determines whether the first frame includes valid BSS information. In an embodiment, valid BSS information includes Color information corresponding to a color of a BSS, an address of a device that can be used to determine whether the device is associated with the BSS (such as a MAC address), or both.

At S1304, when the process 1300 determines that the first frame does include valid BSS information, the process 1300 proceeds to S1322; and when the process 1300 determines that the first frame does not include valid BSS information, the process proceeds to S1306.

At S1306, the process 1300 determines that the first frame is from an unclassified-BSS frame, deferring the determinations of whether the first frame is an inter-BSS or intra-BSS frame; the station performing the process 1300 enters a deferred-NAV state; and the process 1300 stores TXOP duration information that was indicated in the first frame.

In an embodiment, when the station performing the process 1300 is in the deferred-NAV state, the station performing the process 1300 is not permitted to perform a transmission to a wireless medium. In an embodiment, when the station performing the process 1300 is in the deferred-NAV state, a back-off countdown procedure is postponed even when the wireless medium seems to be idle.

At S1308, the process 1300 detects whether a second frame (frame 2) has been transmitted on the wireless medium within a Short Inter-Frame Space of an end of the reception of the first frame. When the second frame has been transmitted within the Short Inter-Frame Space of the end of the reception of the first frame, the process 1300 proceeds to S1310; otherwise, the process 1300 proceeds to S1318.

At S1310, the process 1300 receives the second frame over the wireless medium. In an embodiment, the second frame is not targeted to the station performing the process 1300.

At S1312, the process 1300 determines whether the second frame includes valid BSS information. When the second frame includes valid BSS information, the process 1300 proceeds to S1314; otherwise, the process 1300 proceeds to S1318.

At S1314, the process 1300 determines, using the BSS information of the second frame, whether the station that transmitted the second frame is in myBSS of the station performing the process 1300. When the process 1300 determines that the station that transmitted the second frame is in the myBSS, the process 1300 proceeds to S1316; otherwise, the process 1300 proceeds to S1318.

At S1316, the process 1300 compares TXOP duration information indicated in the second frame to the TXOP duration information stored at S1306. When an end of the TXOP indicated by the TXOP duration information indicated in the second frame matches an end of the TXOP indicated by the TXOP duration information stored at S1306, the process 1300 proceeds to S1320; otherwise the process 1300 proceeds to S1318.

At S1318, the process 1300 determines that the first frame was an inter-BSS frame, updates an inter-BSS NAV using the stored TXOP duration information, and then ends.

At S1320, the process 1300 determines that the first frame was an intra-BSS frame, updates an intra-BSS NAV using the stored TXOP duration information, and then ends.

At S1322, the process 1000 determines whether station that transmitted the first frame is in myBSS using the BSS information of the first frame. When the station that transmitted the first frame is determined to be in myBSS, the process 1300 determines that the first frame is an intra-BSS frame and updates, using duration information indicated in the first or second frame, an intra-BSS NAV. When the station that transmitted the first frame is not determined to be in myBSS, the process 1300 determines that the first frame is an inter-BSS frame and updates, using the duration information indicated in the first frame, an inter-BSS NAV. The process 1300 then ends.

The process 1300 operates under the assumption that a remaining TXOP duration in a PHY header or MAC header has been set to match the end of a TXOP duration of an RTS frame that occurred at the beginning of frame exchange because there is no reason to update the value in the duration field when inside of an initiated TXOP.

Figure 14:
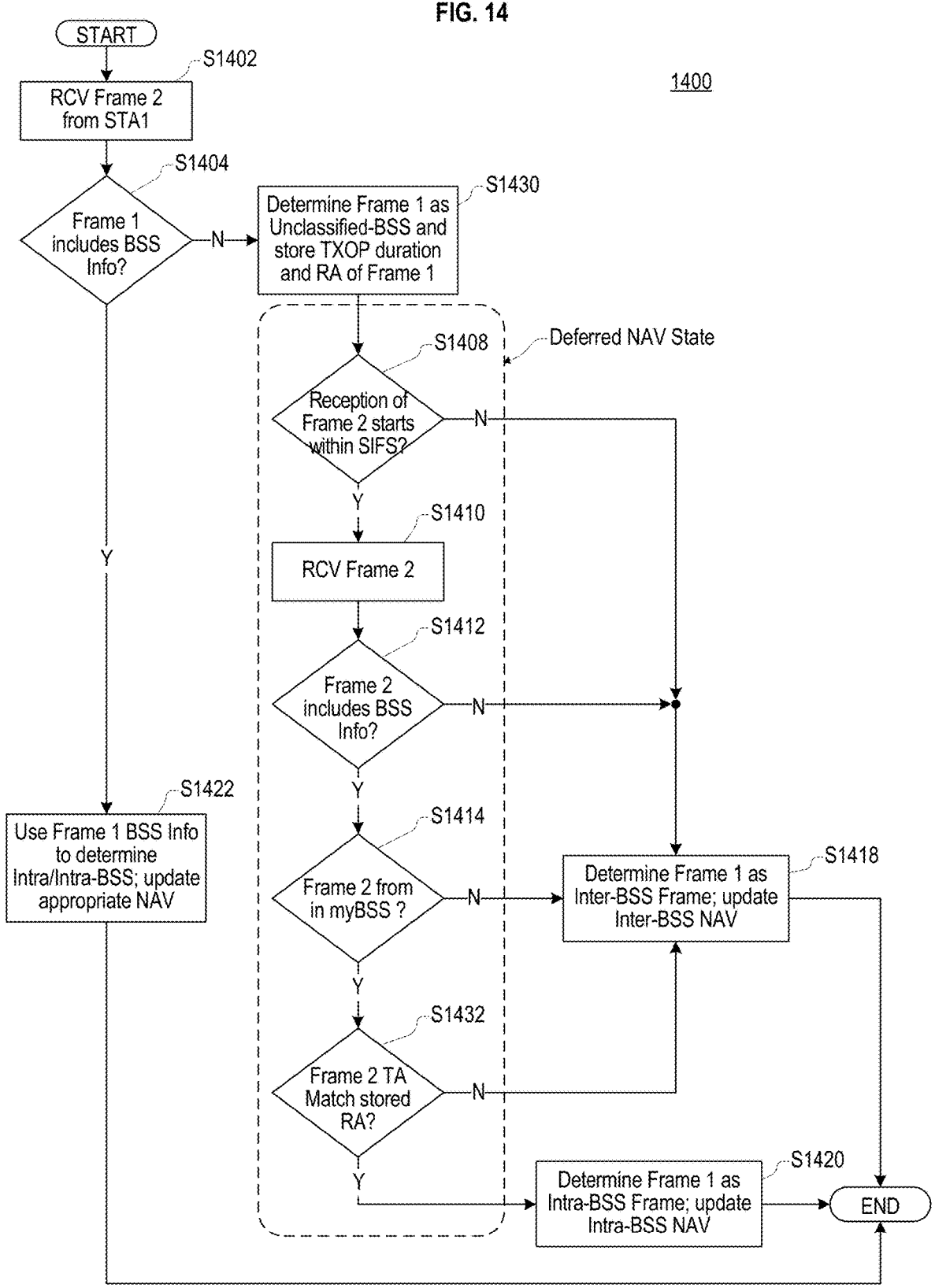
FIG. 14 illustrates a process for determining whether a frame is an Inter-BSS or Intra-BSS frame, according to another embodiment.

FIG. 14 illustrates a process 1400 for determining whether a frame is an intra-BSS or inter-BSS frame, according to another embodiment. The process 1400 uses TA and RA information to retroactively determine whether a frame is an inter-BSS or intra-BSS frame.

Features of process 1400 of FIG. 14 are similar to similarly-named features of process 1300 of FIG. 13. For example, S1402 of process 1400 is similar to S1302 of process 1300, S1404 of process 1400 is similar to S1304 of process 1300, and so on. Process 1400 differs from process 1300 in that S1430 of process 1400 replaces S1306 of process 1300 and S1432 of process 1400 replaces S1316 of process 1300.

At S1430, the process 1400 determines that the first frame is from an unclassified-BSS frame, deferring the determinations of whether the first frame is an inter-BSS or intra-BSS frame; the station performing the process 1400 enters a deferred-NAV state; and the process 1400 stores TXOP duration information that was included in the first frame. In addition, at S1430 the process 1400 stores an RA of the first frame.

At S1432, the process 1400 compares TA included in the second frame to the RA stored at S1430. When TA included in the second frame is the same as the RA stored at S1430, the process 1400 proceeds to S1420; otherwise the process 1400 proceeds to S1418.

In an embodiment, the first frame is a CTS frame. In an embodiment, the second frame is a data frame.

In an embodiment, the first frame is transmitted by a non-AP station. In an embodiment, the second frame is transmitted by an AP.

Figure 15:
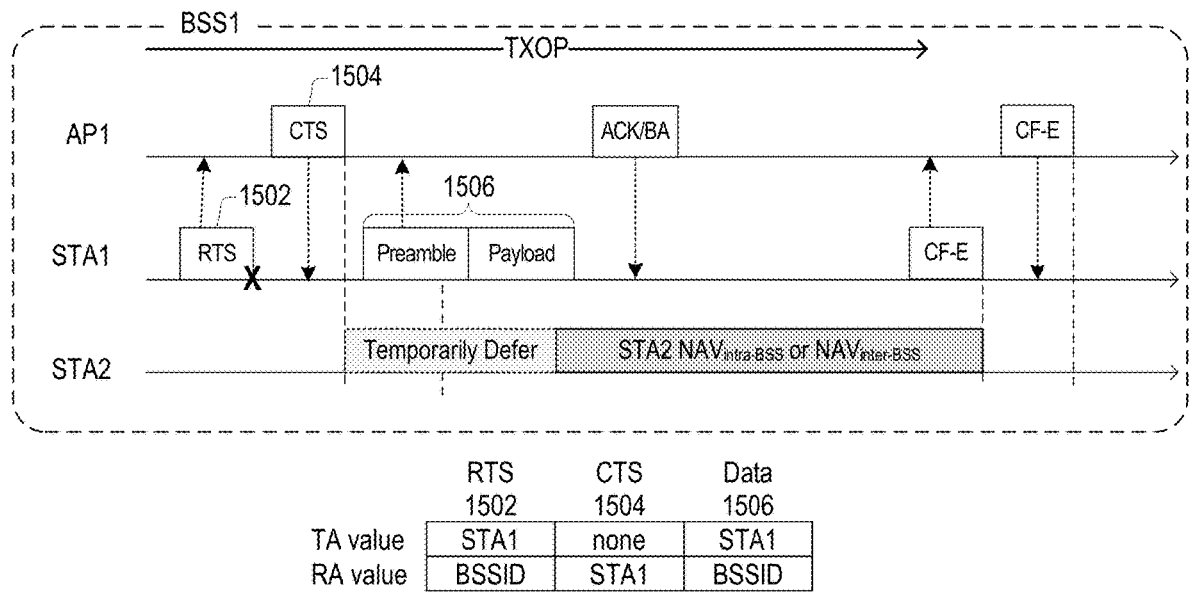
FIG. 15 illustrates a frame exchange and NAV operations related thereto, according to another embodiment.

FIG. 15 illustrates a frame exchange in which a station not involved in the exchange does not receive a first frame of the frame exchange, according to another embodiment. The frame exchange occurs on a wireless medium between an AP and a first station STA1 and is observed by a second station STA2 that does not participate in the frame exchange. All of the AP and the first and second stations STA1 and STA2 are associated with a same BSS having a BSS Identifier BSSID.

The first station STA1 holds a TXOP and transmits an RTS frame 1502 to the AP. The second station STA2 does not receive the RTS frame 1502, as indicated by the "X" on the RTS frame 1502 in FIG. 15.

In response to the RTS frame 1502, the AP transmits, over the wireless medium, a CTS frame 1504 to the first station STA1. The first station STA1 receives the CTS frame 1504.

The second station STA2 also receives the CTS frame 1504. When the second station STA2 is using the process 1400, the second station STA2 also stores an RA included in the CTS frame 1504.

The second station STA2 also enters a deferred-NAV state, wherein the second station STA2 will not attempt any transmissions on the wireless medium.

In response to the CTS frame 1504, the first station STA1 transmits a data frame 1506 to the AP. The second station STA2 also receives the data frame 1506. The second station STA2, using the process 1300 or the process 1400, determines that the data frame 1506 in an intra-BSS frame.

When the second station STA2 uses the process 1300, the second station STA2 determines whether the CTS frame 1504 was an intra-BSS frame or an inter-BSS frame by comparing the stored TXOP duration information from the CTS frame 1504 to TXOP duration information included in the data frame 1506. When the second station STA2 uses the process 1400, the second station STA2 determines whether the CTS frame 1504 was an intra-BSS frame or an inter-BSS frame by comparing the stored RA from the CTS frame 1504 to TA in the data frame 1506.

When the second station STA2 determines that the CTS frame 1504 is the intra-BSS frame, the second station STA2 exits the deferred-NAV state and updates an Intra-BSS NAV of the second station STA2 using the stored TXOP duration information from the CTS frame 1504 or TXOP duration information included in the data frame 1506. When the second station STA2 determines that the CTS frame 1504 is the inter-BSS frame, the second station STA2 exits the deferred-NAV state and updates an Inter-BSS NAV of the second station STA2 using the stored TXOP duration information from the CTS frame 1504.

Embodiments can prevent a performance loss that may occur when an intra-BSS frame is not identified as an intra-BSS frame.

The solutions provided herein have been described with reference to a wireless LAN system; however, it should be understood that these solutions are also applicable to other network environments, such as cellular telecommunication networks, wired networks, etc.

The above explanation and figures are applied to an HE station, an HE frame, an HE PPDU, an HE-SIG field and the like of the IEEE 802.11ax amendment, but they can also be applied to a receiver, a frame, PPDU, a SIG field, and the like of another future amendment of IEEE 802.11.

Embodiments of the present disclosure include electronic devices configured to perform one or more of the operations described herein. However, embodiments are not limited thereto.

Embodiments of the present disclosure may further include systems configured to operate using the processes described herein. The systems may include basic service sets (BSSs) such as the BSSs 100 of FIG. 1, but embodiments are not limited thereto.

Embodiments of the present disclosure may be implemented in the form of program instructions executable through various computer means, such as a processor or microcontroller, and recorded in a non-transitory computer-readable medium. The non-transitory computer-readable medium may include one or more of program instructions, data files, data structures, and the like. The program instructions may be adapted to execute the processes and to generate and decode the frames described herein when executed on a device such as the wireless devices shown in FIG. 1.

In an embodiment, the non-transitory computer-readable medium may include a read only memory (ROM), a random access memory (RAM), or a flash memory. In an embodiment, the non-transitory computer-readable medium may include a magnetic, optical, or magneto-optical disc such as a hard disk drive, a floppy disc, a CD-ROM, and the like.

In some cases, an embodiment of the invention may be an apparatus (e.g., an AP station, a non-AP station, or another network or computing device) that includes one or more hardware and software logic structure for performing one or more of the operations described herein. For example, as described above, the apparatus may include a memory unit, which stores instructions that may be executed by a hardware processor installed in the apparatus. The apparatus may also include one or more other hardware or software elements, including a network interface, a display device, etc.

While this invention has been described in connection with what is presently considered to be practical embodiments, embodiments are not limited to the disclosed embodiments, but, on the contrary, may include various modifications and equivalent arrangements included within the spirit and scope of the appended claims. The order of operations described in a process is illustrative and some operations may be re-ordered. Further, two or more embodiments may be combined.

What is claimed is:

1. A wireless device that operates in a wireless network, the wireless device comprising:
 a memory unit; and
 a processor coupled to the memory unit, wherein the memory unit includes instructions that when executed by the processor cause the wireless device to:

receive a frame, wherein the frame includes a recipient address that indicates an intended recipient of the frame, compare the recipient address of the frame with a transmission opportunity holder address, determine based on a result of the comparison whether the frame is an intra-basic service set frame, and in response to determining, using the transmission opportunity holder address and the recipient address of the frame, that the frame is an intra-basic service set frame, update an intra-basic service set network allocation vector based on the frame.

2. The wireless device of claim 1, wherein the instructions, when executed by the processor, further cause the wireless device to:

in response to determining, using the transmission opportunity holder address and the recipient address of the frame, that the frame is not an intra-basic service set frame, update an inter-basic service set network allocation vector based on the frame.

3. The wireless device of claim 2, wherein the frame is not the intended recipient of the frame when the frame is determined to not be an intra-basic service set frame.

4. The wireless device of claim 1, wherein the frame is an intra-basic service set frame when the recipient address of the frame matches the transmission opportunity holder address.

5. The wireless device of claim 1, wherein the frame is the intended recipient of the frame when the frame is determined to be an intra-basic service set frame.

6. The wireless device of claim 1, wherein the frame is a control frame that does not have a transmitter address (TA) field.

7. The wireless device of claim 1, wherein the transmission opportunity holder address is set based on a transmission in the wireless network that preceded the frame.

8. The wireless device of claim 7, wherein the transmission is a request to send and clear to send frame exchange.

9. A non-transitory machine-readable storage medium that includes instructions which, when executed by a processor of a wireless device, cause the wireless device to:

receive a frame, wherein the frame includes a recipient address that indicates an intended recipient of the frame;

compare the recipient address of the frame with a transmission opportunity holder address, determine based on a result of the comparison whether the frame is an intra-basic service set frame; and in response to determining, using the transmission opportunity holder address and the recipient address of the frame, that the frame is an intra-basic service set frame, update an intra-basic service set network allocation vector based on the frame.

10. The non-transitory machine-readable storage medium of claim 9, wherein the instructions, when executed by the processor, further cause the wireless device to:

in response to determining, using the transmission opportunity holder address and the recipient address of the frame, that the frame is not an intra-basic service set frame, update an inter-basic service set network allocation vector based on the frame.

11. The non-transitory machine-readable storage medium of claim 10, wherein the frame is not the intended recipient of the frame when the frame is determined to not be an intra-basic service set frame.

12. The non-transitory machine-readable storage medium of claim 9, wherein the frame is an intra-basic service set frame when the recipient address of the frame matches the transmission opportunity holder address.

13. The non-transitory machine-readable storage medium of claim 9, wherein the frame is the intended recipient of the frame when the frame is determined to be an intra-basic service set frame.

14. The non-transitory machine-readable storage medium of claim 9, wherein the frame is a control frame that does not have a transmitter address (TA) field.

15. The non-transitory machine-readable storage medium of claim 9, wherein the transmission opportunity holder address is set based on a transmission in the wireless network that preceded the frame.

16. The non-transitory machine-readable storage medium of claim 15, wherein the transmission is a request to send and clear to send frame exchange.

17. A method, performed by a wireless device, for communicating in a wireless local area network, the method comprising:

receiving, by the wireless device, a frame, wherein the frame includes a recipient address that indicates an intended recipient of the frame;

comparing, by the wireless device, the recipient address of the frame with a transmission opportunity holder address, determining, by the wireless device, based on a result of the comparison whether the frame is an intra-basic service set frame; and in response to determining, using the transmission opportunity holder address and the recipient address of the frame, that the frame is an intra-basic service set frame, updating, by the wireless device, an intra-basic service set network allocation vector based on the frame, and wherein the intra-basic server set network allocation vector is used by the wireless device to control transmissions in the local wireless area network and the update is based on duration information of the frame.

18. The method of claim 17, further comprising:

in response to determining, using the transmission opportunity holder address and the recipient address of the frame, that the frame is not an intra-basic service set frame, updating, by the wireless device, an inter-basic service set network allocation vector based on the frame.

19. The method of claim 18, wherein the frame is not the intended recipient of the frame when the frame is determined to not be an intra-basic service set frame.

20. The method of claim 17, wherein the frame is an intra-basic service set frame when the recipient address of the frame matches the transmission opportunity holder address, and wherein the frame is the intended recipient of the frame when the frame is determined to be an intra-basic service set frame.

* * * * *